United States Patent
Lim et al.

(10) Patent No.: US 11,093,727 B2
(45) Date of Patent: Aug. 17, 2021

(54) ELECTRONIC DEVICE INCLUDING ULTRASONIC IN-DISPLAY FINGERPRINT SENSOR AND OPERATING METHOD THEREOF

(71) Applicant: SAMSUNG ELECTRONICS CO., LTD., Suwon-si (KR)

(72) Inventors: Dahee Lim, Suwon-si (KR); Sungjun Lee, Suwon-si (KR); Kiwon Kim, Suwon-si (KR); Gyuwon Moon, Suwon-si (KR); Soonkoo Park, Suwon-si (KR); Hyelin Lee, Suwon-si (KR); Seungmin Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 16/550,062

(22) Filed: Aug. 23, 2019

(65) Prior Publication Data

US 2020/0074134 A1    Mar. 5, 2020

(30) Foreign Application Priority Data

Sep. 4, 2018 (KR) .................... 10-2018-0105481

(51) Int. Cl.
*G06K 9/00* (2006.01)

(52) U.S. Cl.
CPC ....... *G06K 9/0002* (2013.01); *G06K 9/00892* (2013.01); *G06K 9/00926* (2013.01)

(58) Field of Classification Search
None
See application file for complete search history.

(56) References Cited

U.S. PATENT DOCUMENTS

| 8,666,126 B2 | 3/2014 | Lee et al. |
| 9,323,393 B2 | 4/2016 | Djordjev et al. |

(Continued)

FOREIGN PATENT DOCUMENTS

| CN | 105893989 | 8/2016 |
| KR | 10-1288178 | 7/2013 |

(Continued)

OTHER PUBLICATIONS

Extended Search Report dated Dec. 10, 2019 in counterpart European Patent Application No. EP19195379.3.

(Continued)

*Primary Examiner* — Fayyaz Alam
(74) *Attorney, Agent, or Firm* — Nixon & Vanderhye P.C.

(57) ABSTRACT

Various embodiments of the disclosure relate generally to an electronic device and its operating method for creating a calibration condition of an in-display fingerprint sensor and calibrating the fingerprint sensor according to the created condition, using a touchscreen display. The electronic device may according to various embodiments of the disclosure include a housing, a touchscreen display disposed inside the housing and viewable through one surface of the housing, an ultrasonic fingerprint sensor disposed inside the housing an overlapping one area of the touchscreen display when viewed from above the one surface of the housing, the ultrasonic fingerprint sensor further comprising a temperature measuring sensor, at least one processor operatively coupled with the touchscreen display and the ultrasonic fingerprint sensor, and at least one memory operatively coupled with the at least one processor, and configured to store a first reference fingerprint image relating to authentication using the ultrasonic fingerprint sensor, wherein the at least one memory may be configured to store instructions that, when executed, cause the at least one processor to (Continued)

control the electronic device to: measure a temperature change using the temperature measuring sensor, determine a presence of a foreign substance on the one area using the touchscreen display, and determine whether to calibrate the ultrasonic fingerprint sensor according to the temperature change, based at least in part on determining the presence of a foreign substance.

20 Claims, 15 Drawing Sheets

(56) References Cited

U.S. PATENT DOCUMENTS

| | | | |
|---|---|---|---|
| 10,031,218 B2 | 7/2018 | Min et al. | |
| 10,254,881 B2 | 4/2019 | Bandyopadhyay et al. | |
| 10,417,472 B2 | 9/2019 | Lee et al. | |
| 2016/0063294 A1 | 3/2016 | Du et al. | |
| 2016/0070404 A1 | 3/2016 | Kerr et al. | |
| 2016/0246396 A1* | 8/2016 | Dickinson | G06K 9/00107 |
| 2016/0306491 A1* | 10/2016 | Lee | G06F 3/0416 |
| 2016/0378244 A1 | 12/2016 | Bandyopadhyay et al. | |
| 2017/0231534 A1 | 8/2017 | Agassy et al. | |
| 2017/0255338 A1* | 9/2017 | Medina | G06F 3/0416 |
| 2017/0323137 A1* | 11/2017 | Andersson | G06K 9/209 |
| 2017/0372122 A1 | 12/2017 | Shim et al. | |
| 2018/0101711 A1* | 4/2018 | D'Souza | G06K 9/228 |
| 2018/0276440 A1* | 9/2018 | Strohmann | G06K 9/0008 |
| 2018/0276443 A1* | 9/2018 | Strohmann | G06K 9/0002 |
| 2019/0034020 A1* | 1/2019 | He | G06K 9/00107 |
| 2019/0391432 A1* | 12/2019 | Lee | G06F 1/1686 |
| 2020/0342196 A1* | 10/2020 | Chang | G06F 3/04166 |

FOREIGN PATENT DOCUMENTS

| | | |
|---|---|---|
| KR | 10-2015-0083794 | 7/2015 |
| KR | 10-2016-0125142 | 10/2016 |
| KR | 10-2017-0077982 | 7/2017 |
| KR | 10-1784781 | 10/2017 |
| KR | 10-2018-0022692 | 3/2018 |

OTHER PUBLICATIONS

International Search Report and Written Opinion dated Dec. 23, 2020 in counterpart International Patent Application No. PCT/KR2019/010644.

European Office Action dated May 6, 2021 for EP Application No. 19195379.3.

* cited by examiner (TOP VIEW)

(SECTION VIEW)

Normal

Finger

Palm

Wet

ELECTRONIC DEVICE INCLUDING ULTRASONIC IN-DISPLAY FINGERPRINT SENSOR AND OPERATING METHOD THEREOF

CROSS-REFERENCE TO RELATED APPLICATION

This application is based on and claims priority under 35 U.S.C. § 119 to Korean Patent Application No. 10-2018-0105481, filed on Sep. 4, 2018, in the Korean Intellectual Property Office, the disclosure of which is incorporated by reference herein in its entirety.

BACKGROUND

Field

The disclosure relates generally to an electronic device including an ultrasonic in-display fingerprint sensor and its operating method for creating a calibration condition of the fingerprint sensor and calibrating the fingerprint sensor according to the created calibration condition.

Description of Related Art

An electronic device such as a smartphone or a tablet personal computer (PC) is recently popularized, and a smartphone using a fingerprint sensor is gradually increasing. The fingerprint sensor used in the smartphone is used more often due to its high usability and high security, and utilizes various schemes such as optical, capacitive, and ultrasonic schemes.

The fingerprint sensor may be disposed at a bottom of a screen (or a display) on a front surface of the smartphone, or on a rear surface of the smart phone. In recent, an electronic device including an in-display fingerprint sensor which is integrated with the screen (or the display) is released.

A fingerprint recognition method using an ultrasonic scheme may compare a user's reference fingerprint image initially registered, with a user's fingerprint image actually recognized. However, since the speed of sound is affected by temperature, the ultrasonic fingerprint recognition may calibrate the reference fingerprint image (or a fingerprint sensor) to compensate for the temperature.

To determine whether the fingerprints match, it may be important to acquire the accurate reference fingerprint image. For example, if a user unintentionally places an object on the fingerprint sensor, an inaccurate reference fingerprint image may be acquired.

Likewise, the fingerprint sensor, which is not able to detect the situation on the fingerprint sensor in the calibration for the temperature compensation, may perform incorrect calibration.

SUMMARY

Various embodiments of the disclosure may reduce abnormal calibration and enhance the recognition of the fingerprint sensor, by creating a calibration condition for the calibration to compensate for the temperature, and calibrating the reference fingerprint image based on the created calibration condition.

According to various example embodiments of the disclosure, an electronic device may include a housing, a touchscreen display disposed inside the housing and viewable through one surface of the housing, an ultrasonic fingerprint sensor disposed inside the housing and overlapping one area of the touchscreen display when viewed from above the one surface of the housing, the ultrasonic fingerprint sensor further comprising a temperature measuring sensor, at least one processor operatively coupled with the touchscreen display and the ultrasonic fingerprint sensor, and at least one memory operatively coupled with the at least one processor, and configured to store a first reference fingerprint image relating to authentication using the ultrasonic fingerprint sensor, wherein the at least one memory may be configured to store instructions which, when executed, cause the at least one processor to control the electronic device to: measure a temperature change using the temperature measuring sensor, determine a presence of a foreign substance on the one area using the touchscreen display, and determine whether to calibrate the ultrasonic fingerprint sensor based on the temperature change, based at least in part on determining the presence of a foreign substance on the one area.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

Throughout the drawings, like reference numerals will be understood to refer to like parts, components and structures.

DETAILED DESCRIPTION

Figure 1:
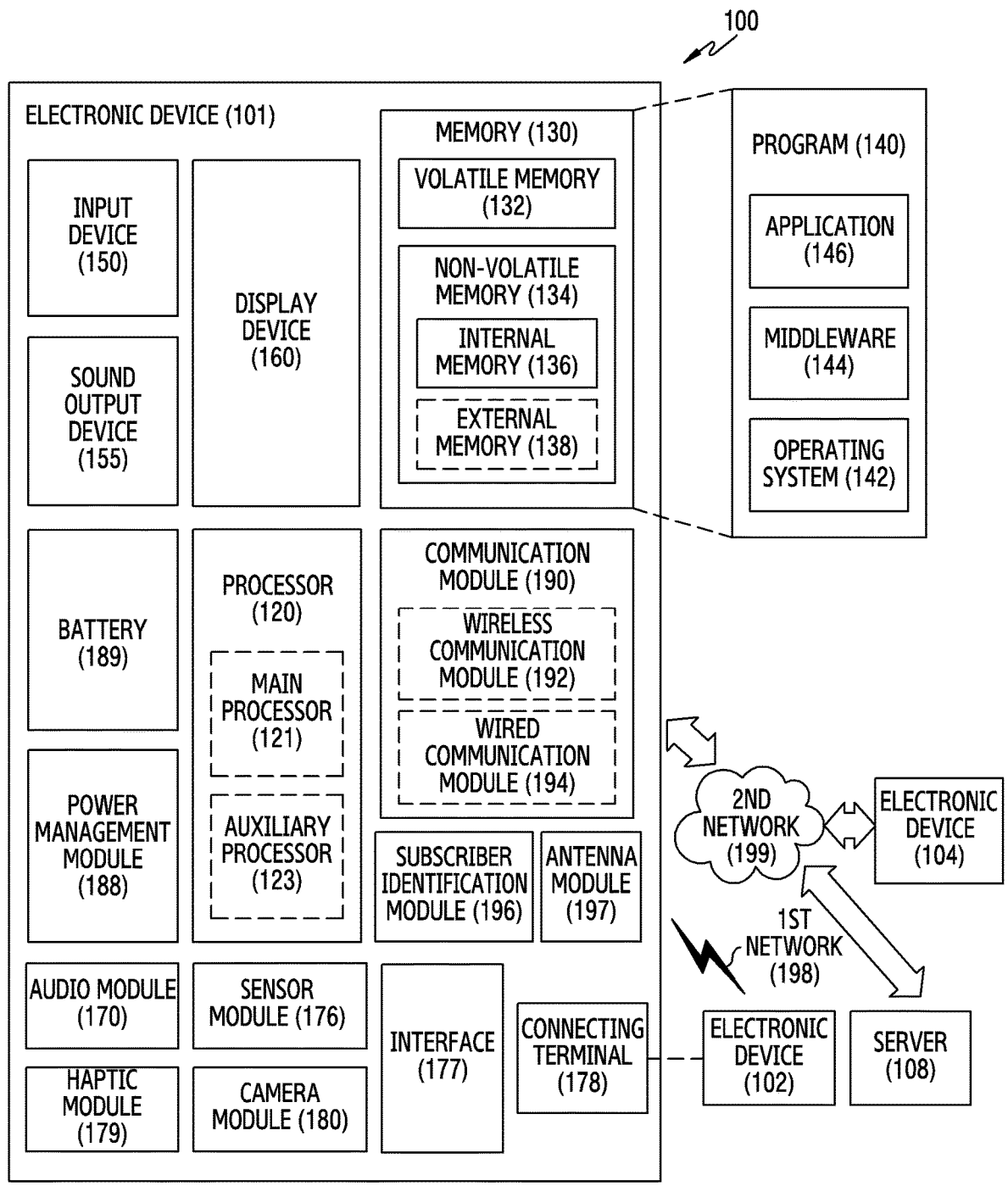
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
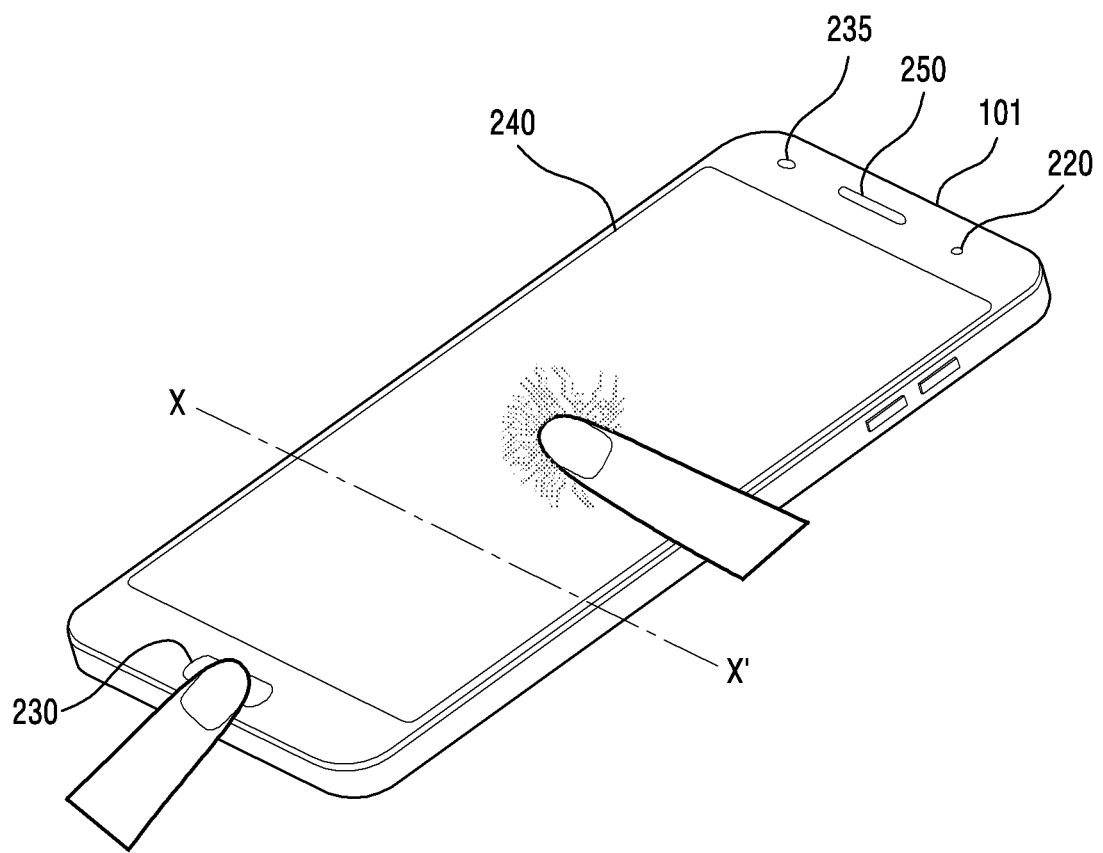
FIG. 2 is a diagram illustrating an exterior of an example electronic device according to various embodiments of the disclosure.

FIG. 2 is a diagram illustrating an exterior of an example electronic device according to various embodiments of the disclosure.

Referring to FIG. 2, a touchscreen display 240 may be disposed in a front surface of an electronic device 101. The touchscreen display 240 may be the display device 160 of FIG. 1.

In an example embodiment, the touchscreen display 240 may display content, and receive an input (e.g., a touch input from a user). For example, the touchscreen display 240 may display an execution screen of at least one application which is running. For example, the touchscreen display 240 may receive the touch input such as, for example, and without limitation, a tap input, a multi-touch input, a drag touch input, or the like.

In an example embodiment, the touchscreen display 240 may include at least one sensor. For example, the touchscreen display 240 may include, for example, and without limitation, at least one of a touch sensor, a fingerprint sensor, a pressure sensor, a temperature sensor, or the like. The touch sensor may detect the user's touch inputs as mentioned above. In another embodiment, when viewed from above the touchscreen display 240, the at least one sensor may be disposed to overlap with at least part of the touchscreen display 240. For example, the fingerprint sensor may be disposed at a lower portion of the touchscreen display 240. Hereafter, the fingerprint sensor disposed inside (or at the lower portion of) the touchscreen display 240 may be referred to as an in-display fingerprint sensor. Although not depicted, the fingerprint sensor may be disposed below a button 230 (i.e., between the button 230 and a rear surface of the electronic device 101).

In an example embodiment, if at least part (e.g., a finger) of a user's body contacts the touchscreen display 240, the touchscreen display 240 may generate corresponding touch input data and activate the fingerprint sensor. In response to the contact of the at least part (e.g., the finger) of the user's body, the activated fingerprint sensor may generate corresponding fingerprint sensing data.

In an example embodiment, one or more sensors may be disposed on a front surface of the electronic device 101. The one or more sensors may be disposed above the touchscreen display 240. The one or more sensors may, for example, and without limitation, include at least one of a camera sensor 235, a proximity sensor 220, and an optical sensor (not shown).

In an example embodiment, a speaker 250 may be disposed on the front surface of the electronic device 101. For example, the speaker 250 may be a speaker for a voice call or a video call.

In an example embodiment, a button 230 may be disposed on the front surface of the electronic device 101. The button 230 may be disposed below the touchscreen display 240. The button 230 may be a physical button or a virtual button. The button 230 may, for example, be used to receive a user's input. In response to detecting the user input to the button 230, the electronic device 101 may, for example, activate or deactivate the touchscreen display 240, change a mode of the electronic device 101 (e.g., change the electronic device 101 from a sleep mode to an active mode), etc.

Figure 3A:
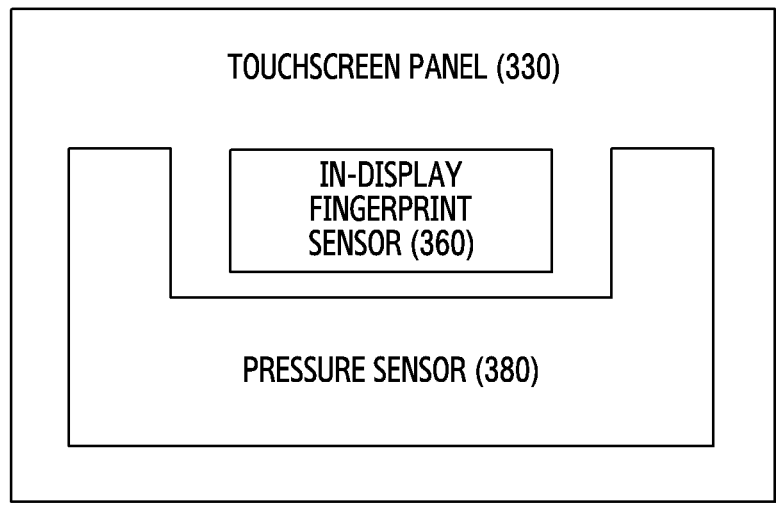
FIG. 3A is a diagram illustrating a top view inside an electronic device according to various embodiments of the disclosure.
Figure 3B:
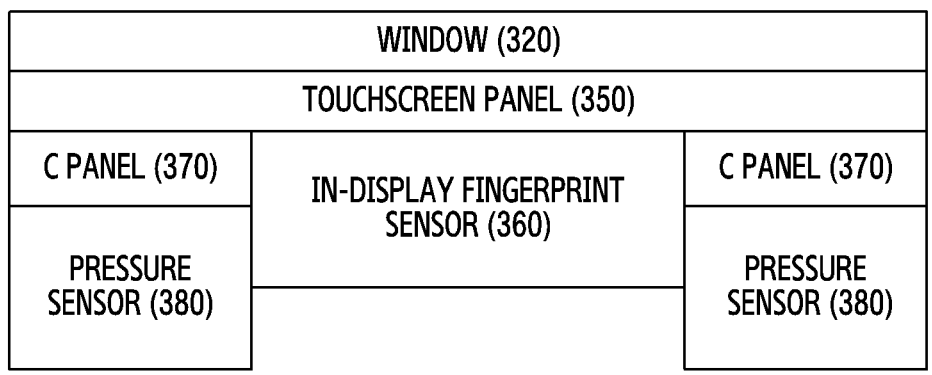
FIG. 3B is a sectional view illustrating an inside the electronic device according to various embodiments of the disclosure.

FIGS. 3A and 3B are diagrams illustrating a top view and a sectional view, respectively, inside an example electronic device according to various embodiments of the disclosure.

FIG. 3A illustrates the top view inside the electronic device (e.g., the electronic device 101 of FIG. 1).

Referring to FIG. 3A, in an example embodiment, a touchscreen panel 330 may be disposed inside and/or outside the electronic device 101. In an example embodiment, the touchscreen panel 330 may include a touch panel for detecting a touch input and a display panel (e.g., an LCD panel) for outputting a screen. In another embodiment, the display panel may be disposed near (or adjacent to) the touchscreen panel 330, and the touchscreen display (e.g., the touchscreen display 240 of FIG. 2) may include the touchscreen panel 330 and the display panel.

In an example embodiment, an in-display fingerprint sensor 360 may be disposed in the electronic device. The in-display fingerprint sensor 360 may be disposed close to the touchscreen panel 330. For example, the in-display fingerprint sensor 360 may be disposed above the touchscreen panel 330 in proximity to the touchscreen panel 330, and may be disposed under the touchscreen panel 330 in proximity to the touchscreen panel 330. However, it will be understood that the disclosure is not limited thereto.

In an example embodiment, the in-display fingerprint sensor 360 may be disposed, when viewed from above the touchscreen panel 330, to overlap with at least part of the touchscreen panel 330. For example, when viewed from above the touchscreen panel 330, whole of the in-display fingerprint sensor 360 may be disposed to be covered by the touchscreen panel 330. For example, when viewed from above the touchscreen panel 330, part of the in-display fingerprint sensor 360 may be covered and the rest may not be covered by the touchscreen panel 330.

In an example embodiment, a pressure sensor 380 may be disposed, when viewed from above the touchscreen panel 330, to overlap with at least part of the touchscreen panel 330. For example, when viewed from above the touchscreen panel 330, whole of the pressure sensor 380 may be covered by the touchscreen panel 330. Although not depicted, the pressure sensor 380 may be disposed independently of the touchscreen display 240 or the touchscreen panel 330.

In an example embodiment, the pressure sensor 380 may be disposed, when viewed from above the touchscreen panel 330, not to overlap with at least part of the in-display fingerprint sensor 360. For example, when viewed from above the touchscreen panel 330, whole of the pressure sensor 380 may be covered by the touchscreen panel 330 and may not overlap with at least part of the in-display fingerprint sensor 360. The pressure sensor 380 may be disposed close the touchscreen panel 330, and may be disposed below (or above) the touchscreen panel 330. At least part of the pressure sensor 380 may be disposed on substantially the same layer as at least part of the in-display fingerprint sensor 360. When viewed from above the touchscreen panel 330, the pressure sensor 380 may be disposed to at least partially surround the in-display fingerprint sensor 360. For example, when viewed from above the touchscreen panel 330, the mounting area of the in-display fingerprint sensor 360 may substantially correspond to the mounting area of the touchscreen panel 330. In this case, the pressure sensor 380 may be disposed substantially on a different layer from the in-display fingerprint sensor 360. For example, the pressure sensor 380 may be interposed between the touchscreen panel 330 and the in-display fingerprint sensor 360, or may be disposed below the in-display fingerprint sensor 360.

FIG. 3B is a diagram illustrating a sectional view inside the electronic device according to various embodiments of the disclosure.

In an example embodiment, FIG. 3B may be a cross sectional diagram, taken along x-x' of the electronic device 101 of FIG. 2.

Referring to FIG. 3B, a window 320 may be disposed on a touchscreen panel 350 in proximity. The window 320 may, for example, be a layer formed with a transparent material to protect the touchscreen panel 350 and to allow the user to easily view a screen displayed on the touchscreen panel 350.

In an example embodiment, the touchscreen panel 350 may be disposed. The touchscreen panel 350 may correspond to the touchscreen panel 330 of FIG. 3A. The window 320 and the touchscreen panel 350 may correspond to the touchscreen display 240 of FIG. 2. The touchscreen panel 350 may correspond to the touchscreen display 240 of FIG. 2.

In an example embodiment, the in-display fingerprint sensor 360 may be disposed close to the touchscreen panel 350. When viewed from above the touchscreen panel 350, the in-display fingerprint sensor 360 may be disposed to overlap with at least part of the touchscreen panel 350.

In an example embodiment, when viewed from above the touchscreen panel 350, at least one cover panel (C panel) 370 and at least one pressure sensor 380 may be sequentially disposed to overlap with at least part of the touchscreen panel 350. In an example embodiment, when viewed from above the touchscreen panel 350, the at least one C panel 370 and the at least one pressure sensor 380 may be disposed not to overlap with at least part of the touchscreen panel 350. At least part of the at least one C panel 370 and at least part of the at least one pressure sensor 380 may be disposed on substantially the same layer as at least part of the in-display fingerprint sensor 360.

In an example embodiment, the at least one C panel 370 may, for example, serve as an impact resistant layer for protecting the touchscreen panel 350 from a physical impact and mitigating the physical impact. In another embodiment, the at least one C panel 370 may serve as a shielding layer for blocking display noise from the touchscreen panel 350.

In an example embodiment, the at least one pressure sensor 380 may be disposed below the at least one C panel 370, in proximity with the at least one C panel 370. The at least one pressure sensor 380 may sense a level of a pressure or an external force exerted on the window 320 and/or the touchscreen display 350. The pressure sensor 380 may sense the level of the pressure or the external force exerted on at least part of the window 320 and/or the touchscreen display 350. For example, in response to the external forces exerted at the same time, the pressure sensor 380 may sense the level of the external force on a first area of the window 320 and/or the touchscreen display 350, and sense the level of the external force exerted on a second area, which is different from the first area, of the window 320 and/or the touchscreen display 350.

In an example embodiment, the at least one pressure sensor 380 may sense the level of the pressure or the external force exerted on the window 320 and/or the touchscreen display 350 on a periodic basis or if an event occurs. The at least one pressure sensor 380 may detect a change of sensing data, using sensing data previously acquired (or development of the sensing data) and sensing data currently acquired. The sensing data of the at least one pressure sensor 380 may be stored in a memory 620, and a processor (e.g., a processor 630 of FIG. 6) may detect the change of the sensing data by use of the stored sensing data of the pressure sensor 380.

Although not depicted, the touchscreen display 350 may further include a display panel such as, for example, and without limitation, an active mode organic light emitting diode (AMOLED), a liquid crystal display (LCD), or the like.

Although not depicted, the display panel such as the AMOLED or the LCD may be further disposed between the touchscreen display 350 and the in-display fingerprint sensor 360 and/or the at least one C panel 370.

Although not depicted, the display panel such as the AMOLED or the LCD may be further disposed between the touchscreen display 350 and the window 320.

Figure 4A:
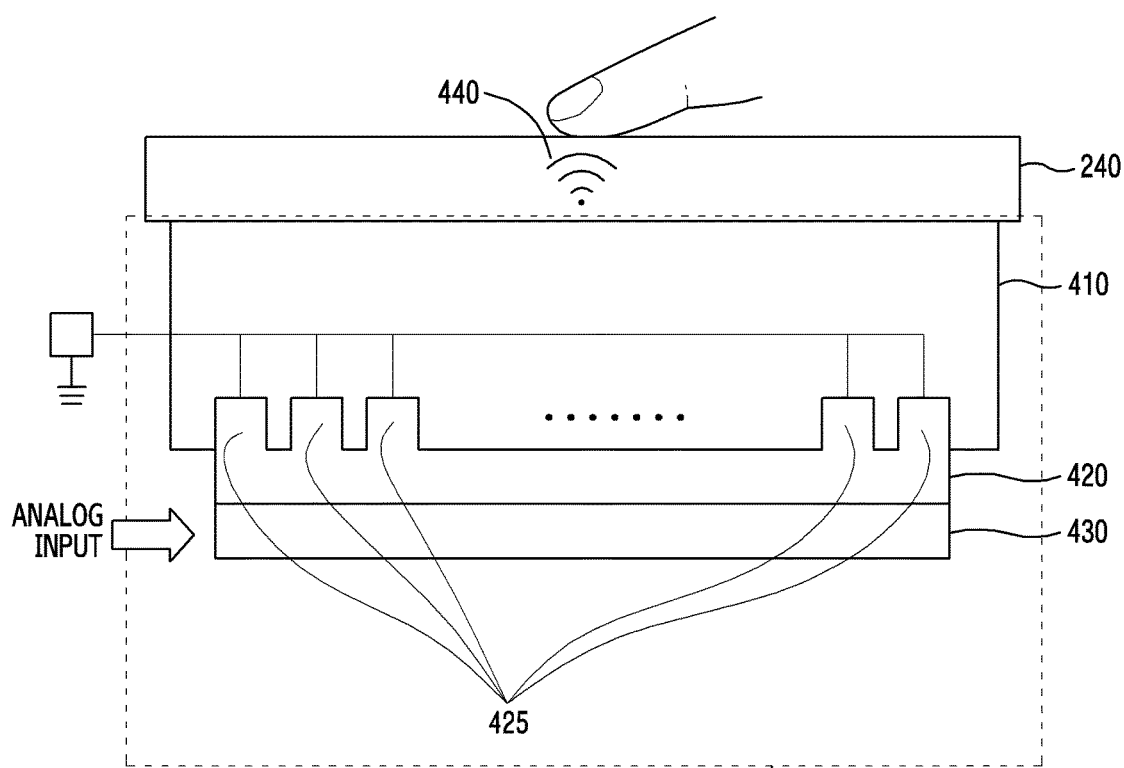
FIG. 4A is a diagram illustrating example operations of an in-display fingerprint sensor according to various embodiments of the disclosure.
Figure 4B:
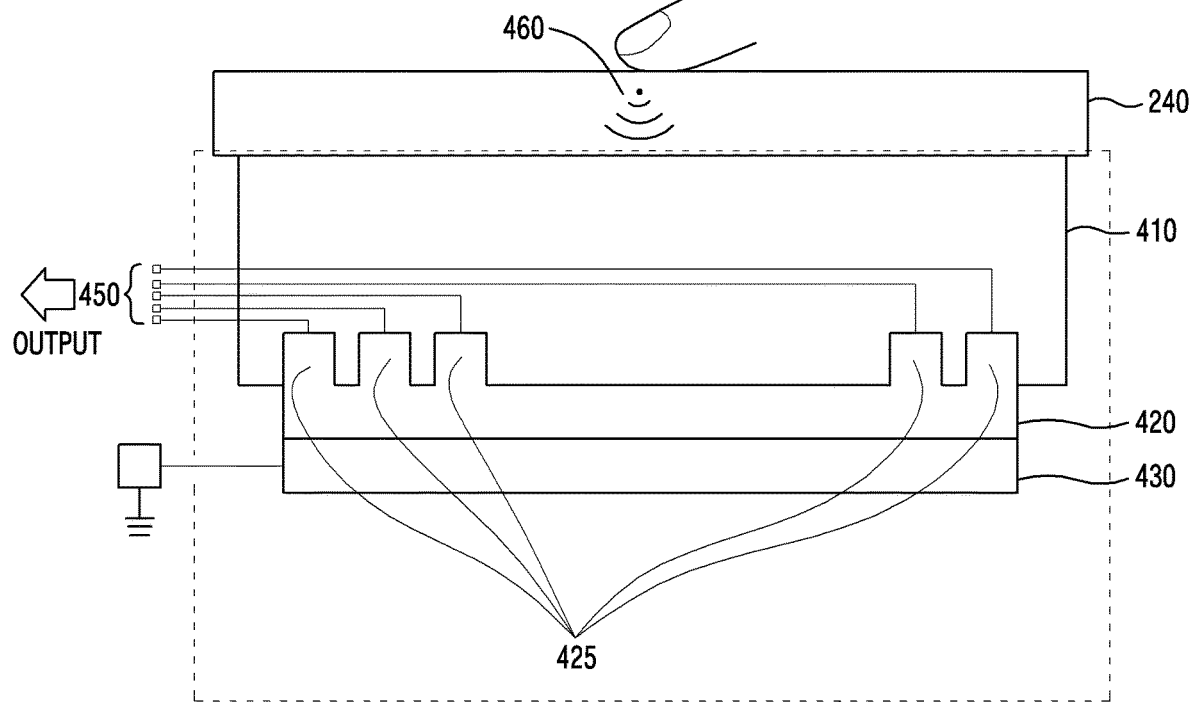
FIG. 4B is a diagram illustrating example operations of the in-display fingerprint sensor according to various embodiments of the disclosure.

FIGS. 4A and 4B are diagrams illustrating example structure and operations of an in-display fingerprint sensor according to various embodiments of the disclosure.

FIG. 4A is a diagram illustrating the structure of the in-display fingerprint sensor and the operations of a Tx mode, and FIG. 4B is a diagram illustrating the structure of the in-display fingerprint sensor and the operations of an Rx mode.

Referring to FIGS. 4A and 4B, the in-display fingerprint sensor 360 may be disposed below the touchscreen display 240, in proximity to the touchscreen display 240.

In an example embodiment, the in-display fingerprint sensor 360 may include a thin film transistor (TFT) substrate 410, a piezoelectric element 420, and a common electrode layer 430. In an example embodiment, the TFT substrate 410, the piezoelectric element 420, and the common electrode layer 430 may be disposed in this order, but the disclosure is not limited thereto. The disposition order of the TFT substrate 410, the piezoelectric element 420, and the common electrode layer 430 disclosed in FIG. 4 is an example and does not limit the scope of the disclosure.

In an example embodiment, the TFT substrate 410 may be disposed close to the touchscreen display 240. The TFT substrate 410 may, for example, and without limitation, be formed of a material such as glass, polyimide (PI), polyethylene terephthalate (PET), or the like. A TFT array 425 may be disposed on the TFT substrate 410 on a pixel basis. The pixels may correspond to two-dimensional coordinates on the touchscreen display 240. The TFT array 425 disposed on the TFT substrate 410 on the pixel basis may sense voltage applied per pixel.

In an example embodiment, the piezoelectric element 420 may be disposed below the TFT array 425, in proximity with the TFT array 425. The piezoelectric element 420 may indicate an element which exhibits electric polarization if a force is applied to a solid. The piezoelectric element 420 may be configured with a piezo material (e.g., polyvinylidene fluoride (PVDF), PVDF-TrFE, PTZ) which may generate a potential difference according to the pressure, or generate a distortion if the potential difference occurs.

In an example embodiment, the common electrode layer 430 may be disposed below the piezoelectric element 420, in proximity to the piezoelectric element 420. The common electrode layer 430 may, for example, and without limitation, be formed of an Ag ink material to minimize and/or reduce resistance.

In an example embodiment, since the common electrode layer 430 becomes an oscillation unit and the TFT array 425 is connected to the ground, the in-display fingerprint sensor 360 operating in the Tx mode may generate the same ultrasonic vibrations to the piezoelectric element 420. For example, an analog signal of 200 Vpp and 5~25 MHz band may be input to the common electrode layer 430 at intervals of 300~600 ns. The ultrasonic waves 440 generated by the potential difference between the common electrode layer 430 and the TFT array 425 may be transferred to the touchscreen display 240 through the TFT substrate 410 (or along the TFT substrate 410).

In an example embodiment, the in-display fingerprint sensor 360 operating in the Rx mode (FIG. 4B) may receive the ultrasonic waves 460 generated in the Tx mode and reflected by a user fingerprint (or a foreign object). The in-display fingerprint sensor 360 operating in the Rx mode may connect the common electrode layer 430 to the ground and sense the voltage applied per pixel of the TFT array 425. If the ultrasonic waves generated in the Tx mode are reflected by the user fingerprint (or the foreign object) and return to the piezoelectric element 420, the level of the ultrasonic vibrations returning per pixel may be changed to the potential difference. Information 450 of the changed potential difference (or voltage) obtained per pixel may be provided to outside (e.g., the processor 630 of FIG. 6). The information 450 of the changed potential difference (or voltage) obtained per pixel may be used to obtain an ultrasonic pattern image.

Figure 5:
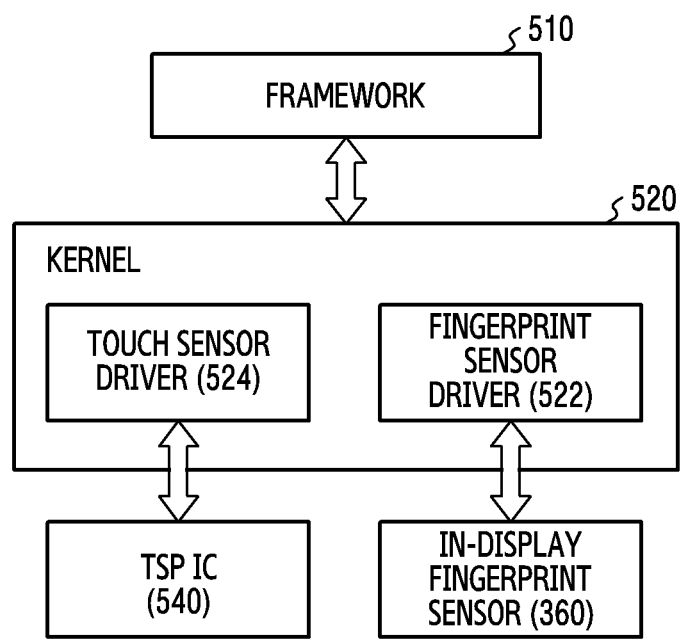
FIG. 5 is a block diagram illustrating example data flows in an electronic device according to various embodiments of the disclosure.

FIG. 5 is a block diagram illustrating example data flows in an electronic device according to various embodiments of the disclosure.

In an example embodiment, the in-display fingerprint sensor 360 may communicate data with a fingerprint sensor driver 522 corresponding to a kernel stage 520. For example, using a temperature sensor (e.g., a temperature sensor 640 of FIG. 6) of the in-display fingerprint sensor 360, the in-display fingerprint sensor 360 may forward to the fingerprint sensor driver 522 data indicating that the in-display fingerprint sensor 360 needs to calibrate.

In an example embodiment, the fingerprint sensor driver 522 may forward an event to a framework 510. The fingerprint sensor driver 522 may forward to the framework 510 the event for identifying context of a touchscreen display (e.g., the touchscreen display 240 of FIG. 2). For example, the fingerprint sensor driver 522 may forward to the framework 510 an event for identifying whether a foreign substance is placed on a surface of the touchscreen display 240.

In an example embodiment, the framework 510 may communicate data with a touch sensor driver 524 corresponding to the kernel stage 520. For example, the framework 510 receiving the event for identifying the context of the touchscreen display 240 from the fingerprint sensor driver 522 may invoke a file system (e.g., sysfs) for identifying the context of the touchscreen display 240 to the touch sensor driver 524.

In an example embodiment, the touch sensor driver 524 may communicate data with a touchscreen panel (TSP) IC 540. The TSP IC 540 may receive an instruction or a command for identifying the context of the touchscreen display 240 from the touch sensor driver 524.

In an example embodiment, in response to the received instruction or command, the TSP IC 540 may identify the context of the touchscreen display 240 and transmit data of the identified context to the touch sensor driver 524. For example, the TSP IC 540 may obtain a touch pattern image of the surface of the touchscreen display 240, compare the obtained touch pattern image with one or more touch pattern images stored in the memory 620 (see, e.g., FIG. 6), and thus identify the context of the touchscreen display 240, which indicates no foreign substance on the touchscreen display 240. The data of the identified context may be forwarded sequentially to the touch sensor driver 524, the framework 510, and the fingerprint sensor driver 522.

In an example embodiment, the fingerprint sensor driver 522, the touch sensor driver 524, and the framework 510 may operate under control of a processor. For example, the fingerprint sensor driver 522, the touch sensor driver 524, and the framework 510 may operate under the control of a processor (e.g., the main processor 121 of FIG. 1). For example, the processor 121 may determine using the temperature sensor 640 (see, e.g., FIG. 6) that the calibration of the in-display fingerprint sensor 360 is required, identify the context (e.g., the presence or the absence of a foreign substance) of the touchscreen display 240, and determine whether to calibrate the in-display fingerprint sensor 360 based on the identified context.

In another embodiment, at least some of the fingerprint sensor driver 522, the touch sensor driver 524, and the framework 510 may operate under the control of a first processor, and the rest may operate under the control of a second processor. For example, the fingerprint sensor driver 522 and the touch sensor driver 524 may operate under the control of an auxiliary processor (e.g., the auxiliary processor 123 of FIG. 1), and the framework 510 may operate under the control of a main processor (e.g., the main processor 121 of FIG. 1). For example, the auxiliary processor 123 may determine that the in-display fingerprint sensor 360 needs to calibrate using the temperature sensor 640, and the main processor 121 may identify the context of the touchscreen display 240 in response a request of the auxiliary processor 123. The auxiliary processor 123 may determine whether to calibrate the in-display fingerprint sensor 360, based on data received from the main processor 121.

Figure 6:
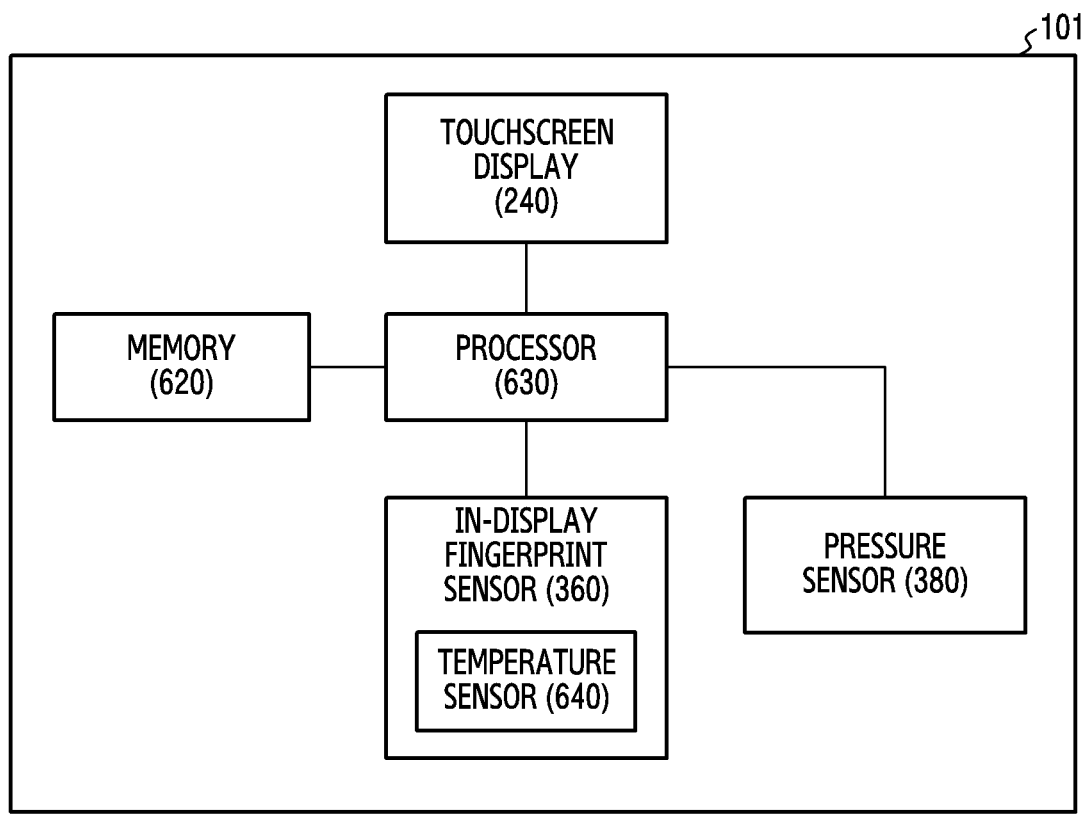
FIG. 6 is a block diagram illustrating an example electronic device according to various embodiments of the disclosure.

FIG. 6 is a block diagram illustrating an example electronic device according to various embodiments of the disclosure.

Referring to FIG. 6, an electronic device 101 may include a touchscreen display 240, the memory 620, the processor (e.g., including processing circuitry) 630, an in-display fingerprint sensor 360, and a pressure sensor 380.

The touchscreen display 240, the memory 620, the processor 630, the in-display fingerprint sensor 360, and the pressure sensor 380 of FIG. 6 may correspond to the display device 160, the memory 130, the processor 120, and the sensor module 176 of FIG. 1 respectively. The pressure sensor 380 may correspond to the display device 160.

In an example embodiment, the touchscreen display 240 may detect a user's touch input. The touchscreen display 240, or a touchscreen panel (e.g., the touchscreen panel 330 of FIG. 3) of the touchscreen display 240 may include a touch sensor (not shown) for detecting the user's touch input. The touchscreen display 240 may, for example, detect the user's touch input using the capacitive scheme. If a conductor touches the surface of the touchscreen display 240, a specific capacitive layer is formed in an insulating layer to transfer a signal, and the capacitive scheme detects a touch position by calculating a signal level. The touchscreen display 240 may identify that the conductor of various types (e.g., a finger, a palm, a water drop) is placed on the surface of the touchscreen display 240. For example, the touchscreen display 240 (or the TSP IC 540) may obtain a touch pattern image of the surface of the touchscreen display 240. The touch pattern image may be determined by, for example, and without limitation, at least one of a shape, a thickness, a distribution, a size, or the like, of the capacitive layer formed by one or more conductors (or air touching the surface if one or more conductors are not placed on the surface) on the surface of the touchscreen display 240, and the shape of the capacitive layer formed by the one or more conductors may be determined, for example, and without limitation, by at least one of a shape, a form, a curve, or the like of the one or more conductors. The touchscreen display 240 or the processor 630 may identify that the conductor of various types is placed on the surface of the touchscreen display 240, by comparing the obtained touch pattern image with one or more touch pattern images stored in the memory 620.

In an example embodiment, the in-display fingerprint sensor 360 may correspond to the in-display fingerprint sensor 360 of FIG. 3, FIG. 4, or FIG. 5.

In an example embodiment, the in-display fingerprint sensor 360 may adopt the ultrasonic scheme. The ultrasonic fingerprint sensor may recognize a user's fingerprint, by projecting ultrasonic waves to the finger on the contacting surface (e.g., the surface of the touchscreen display 240) and converting a reflected fingerprint image to an electric signal.

In an example embodiment, the in-display fingerprint sensor 360 may include the temperature sensor 640. The in-display fingerprint sensor 360 may sense temperature information using the temperature sensor 640, and transfer the sensed temperature information to the processor 630. The in-display fingerprint sensor 360 may periodically detect a current temperature (e.g., the temperature inside or outside the electronic device 101) or a temperature change (e.g., the current temperature is different from a designated temperature over a designated value) of the electronic device 101 using the temperature sensor 640 of the in-display fingerprint sensor 360. The temperature change may be detected by the processor 630 which receives the temperature information from the in-display fingerprint sensor 360.

In an example embodiment, using the ultrasonic scheme, the in-display fingerprint sensor 360 may generate an ultrasonic pattern image of an object placed on the touchscreen display 240. For example, the in-display fingerprint sensor 360 may generate a fingerprint pattern image of a user's finger placed on the touchscreen display 240, as the ultrasonic pattern image.

In another embodiment, if there is no object on the touchscreen display 240, the in-display fingerprint sensor 360 may generate an ultrasonic pattern image (hereafter, referred to as a background image) based on an air state. In an example embodiment, the background image may be distinguished based on the temperature. The background image may be distinguished, for example, and without limitation, by at least one of a type, a density, a content of fine objects (e.g., dusts) floating in the air, or the like, and the type, the density, and the content of the fine objects floating in the air may vary depending on the temperature. For example, a background image corresponding to 10° C. may be distinguished from a background image corresponding to −5° C. For example, a background image corresponding to 10~12° C. may be distinguished from a background image corresponding to −5~−3° C.

In an example embodiment, using the ultrasonic scheme, the in-display fingerprint sensor 360 may generate a fingerprint pattern image of the user's fingerprint, as the ultrasonic pattern image. For example, the in-display fingerprint sensor 360 may generate an initial fingerprint pattern image (hereafter, referred to as a reference fingerprint image), according to a user's input. The in-display fingerprint sensor 360 may transfer the reference fingerprint image to the memory 620, and the memory 620 may at least temporarily store the received reference fingerprint image. If generating the reference fingerprint image, the in-display fingerprint sensor 360 may determine a temperature (hereafter, referred to as a reference temperature) of generating the reference fingerprint image using its temperature sensor 640. The reference temperature may indicate a particular temperature range, rather than a specific temperature, in consideration of a sensing error range of the temperature sensor. The in-display fingerprint sensor 360 may transfer the reference fingerprint image and the reference temperature to the memory 620, and the memory 620 may map and store the received reference fingerprint image with the reference temperature.

In an example embodiment, the pressure sensor 380 may sense a level of a pressure (or an external force) exerted on a particular area of the touchscreen display 240. The pressure sensor 380 may be disposed inside or below the touchscreen display 240.

In an example embodiment, the touchscreen display 240, the in-display fingerprint sensor 360, and the pressure sensor 380 may operate under control of the processor 630.

In another embodiment, although not depicted, the processor 630 may include various processing circuitry and may include a main processor (e.g., the main processor 121 of FIG. 1) and an auxiliary processor (e.g., the auxiliary processor 123 of FIG. 1) (or a microprocessor). The at least one of the touchscreen display 240, the in-display fingerprint sensor 360, and the pressure sensor 380 may operate under the control of the auxiliary processor. For example, the touchscreen display 240, the in-display fingerprint sensor 360, and the pressure sensor 380 may operate under the control of the auxiliary processor, and communicate data via the main processor. For example, the in-display fingerprint sensor 360 may, under the control of the auxiliary processor, determine the calibration of the in-display fingerprint sensor 360 using the temperature sensor 640, and provide relevant data to the main processor. The in-display fingerprint sensor 360 may perform the calibration under the control of the auxiliary processor. According to another embodiment, the touchscreen display 240 may, under the control of the auxiliary processor, identify context (e.g., presence or absence of a foreign subject) of the touchscreen display 240 and provide relevant data to the main processor.

In an example embodiment, the memory 620 may include a volatile memory and/or a nonvolatile memory. The memory 620 may be the memory 130 of FIG. 1. The memory 620 may store commands, data, and one or more applications or programs. For example, the memory 620 may store the reference fingerprint image initially registered by the user. For example, the memory 620 may store condition information for the calibration of the in-display fingerprint sensor 360. The memory 620 may store first condition information corresponding to the temperature, and second condition information corresponding to the context of the touchscreen display 240. For example, the memory 620 may store one or more touch pattern images for identifying whether current context of the touchscreen display 240 satisfies a second condition. The memory 620 may store a first touch pattern image corresponding to a user's palm placed on the surface of the touchscreen display 240, and a second touch pattern corresponding to a water drop placed on the surface of the touchscreen display 240.

In an example embodiment, the memory 620 may store an operating system of the electronic device 101, and store a framework (e.g., the framework 510 of FIG. 5) of the operating system.

In an example embodiment, the processor 630 may be electrically or operatively coupled with the touchscreen display 240, the memory 620, the in-display fingerprint sensor 360, and the pressure sensor 380. The processor 630 may control the touchscreen display 240, the memory 620, the in-display fingerprint sensor 360, and the pressure sensor 380, and control operations of the electronic device 101.

In an example embodiment, the processor 630 may be the processor 120 of FIG. 1.

In an example embodiment, the processor 630 may calibrate the in-display fingerprint sensor 360. In an example embodiment, the in-display fingerprint sensor 360 may adopt the ultrasonic scheme. The fingerprint sensor using the ultrasonic scheme may calibrate according to the speed of sound.

$$v=331.5+0.6t(v=\text{sound of speed}, t=\text{Celsius temperature}) \quad (1)$$

Equation 1 expresses the relationship between the speed of sound and the Celsius temperature if the humidity is 0%. As shown in Equation 1, the speed of sound is affected by the temperature, and varies in a measurement distance based on the temperature difference. For example, if the reference fingerprint image is stored at a specific temperature, the fingerprint recognition under an insignificant temperature change and the fingerprint recognition under a significant temperature change may substantially differ in the success rate of the fingerprint recognition.

In an example embodiment, the calibration of the in-display fingerprint sensor 360 may indicate generating a fingerprint image (hereafter, referred to as a calibration fingerprint image) which is different from the reference fingerprint image stored in the memory 620. For example, the processor 630 may generate the calibration fingerprint image which is different at least in part from the reference fingerprint image, the reference fingerprint image may correspond to a first temperature or a first temperature range (e.g., the reference temperature), and the calibration fingerprint image may correspond to a second temperature which is different from the first temperature or a second temperature range which does not overlap the first temperature range. The processor 630 may at least temporarily store the generated calibration fingerprint image in the memory 620. The memory 620 may map and store the calibration fingerprint image with its corresponding temperature information.

In an example embodiment, the processor 630 may generate a calibration condition of the in-display fingerprint sensor 360. For example, the processor 630 may create a first condition and a second condition for the calibration of the in-display fingerprint sensor 360, the first condition may be a condition regarding the temperature, and the second condition may be a condition regarding the context of the touchscreen display 240.

In an example embodiment, the processor 630 may determine whether a current temperature satisfies the first condition for calibrating the in-display fingerprint sensor 360. For example, the processor 630 may receive current temperature information of the electronic device 101 from the in-display fingerprint sensor 360, and determine whether the current temperature of the electronic device 101 corresponds to a designated range.

In an example embodiment, the processor 630 may determine whether current context of the touchscreen display 240 satisfies the second condition. For example, the processor 630 may identify whether a touch event occurs, or whether an unintended foreign substance (e.g., a water drop, a palm, an earphone cable, or the like) is placed on the touchscreen display 240. In an example embodiment, if the current temperature of the electronic device 101 satisfies the first condition for calibrating the in-display fingerprint sensor 360, the processor 630 may determine whether the current context of the touchscreen display 240 satisfies the second condition.

In an example embodiment, according to whether the current context of the touchscreen display 240 satisfies the second condition, the processor 630 may perform the calibration of the in-display fingerprint sensor 360. For example, if the current context of the touchscreen display 240 satisfies the second condition, the processor 630 may calibrate the in-display fingerprint sensor 360. If the current context does not satisfy the second condition, the processor 630 may not calibrate the in-display fingerprint sensor 360.

In another embodiment, regardless of whether the current context of the touchscreen display 240 satisfies the second condition, the processor 630 may calibrate the in-display fingerprint sensor 360. For example, the processor 630 may calibrate the in-display fingerprint sensor 360 regardless of whether the current context of the touchscreen display 240 satisfies the second condition. If the current context of the touchscreen display 240 does not satisfy the second condition, the processor 630 may delete a newly generated calibration fingerprint image by calibrating the in-display fingerprint sensor 360, may not store the calibration fingerprint image in the memory 620, or may discard the calibration fingerprint image.

Figure 7A:
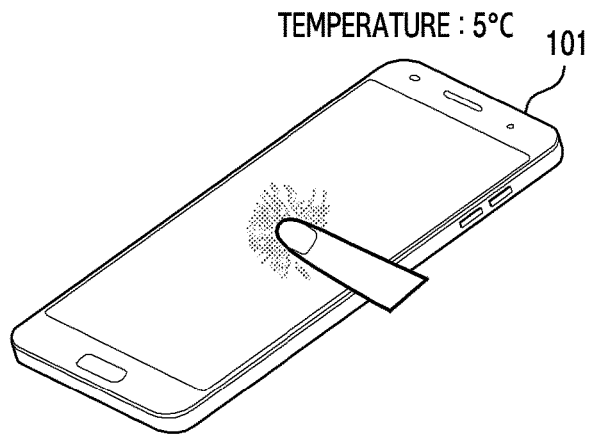
FIG. 7A is a diagram illustrating an example calibration condition of an in-display fingerprint sensor according to various embodiments of the disclosure.
Figure 7B:
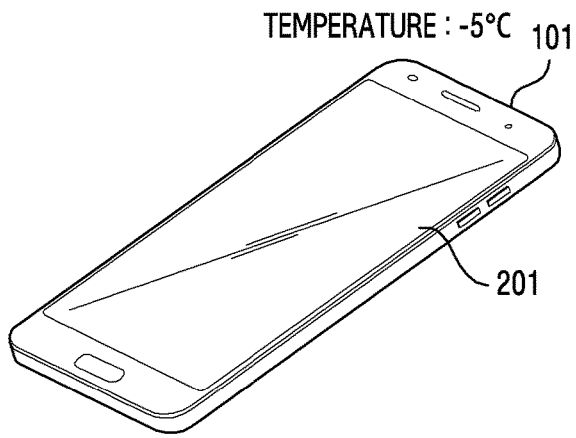
FIG. 7B is a diagram illustrating an example calibration condition of the in-display fingerprint sensor according to various embodiments of the disclosure.
Figure 7C:
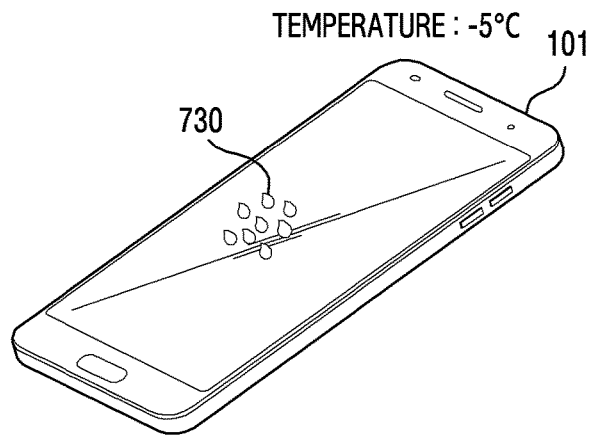
FIG. 7C is a diagram illustrating an example calibration condition of the in-display fingerprint sensor according to various embodiments of the disclosure.
Figure 7C:
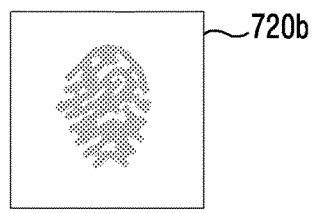

FIGS. 7A, 7B, and 7C are diagrams illustrating examples of a calibration condition of an in-display fingerprint sensor according to various embodiments of the disclosure.

Referring to FIG. 7A, an electronic device 101 (or an in-display fingerprint sensor (e.g., the in-display fingerprint sensor 360 of FIG. 3) of the electronic device 101) may obtain a reference fingerprint image 710 from the user. The electronic device 101 may obtain its temperature information (e.g., reference temperature information) of receiving the reference fingerprint image 710. For example, the electronic device 101 may obtain the reference fingerprint image 710 and the information indicating that the reference fingerprint image 710 is obtained at 5☐. The electronic device 101 may map and store the obtained reference fingerprint image 710 and temperature information (e.g., 5☐) in a memory (e.g., the memory 130 of FIG. 1).

Referring to FIGS. 7B and 7C, the electronic device 101 may calibrate the in-display fingerprint sensor 360, in response to its current temperature−5☐. In an example embodiment, in response to detecting that the current temperature (e.g., −5☐) is different from the reference temperature (e.g., 5☐), the electronic device 101 may calibrate the in-display fingerprint sensor 360. In another embodiment, in response to detecting that the current temperature (e.g., −5☐) does not fall within a reference temperature range (e.g., the range which define its lower bound by subtracting a pre-designated value from the reference temperature (e.g., 5☐) and its upper bound by adding the pre-designated value to the reference temperature, 3☐ through 7☐), the electronic device 101 may calibrate the in-display fingerprint sensor 360.

Referring to FIG. 7B, the electronic device 101 may obtain a first calibration fingerprint image 720a, by calibrating the in-display fingerprint sensor 360. Before obtaining the first calibration fingerprint image 720a, the electronic device 101 may first obtain a first ultrasonic pattern image (not shown) corresponding to the current temperature. For example, the electronic device 101 may first obtain a first ultrasonic pattern image corresponding to −5☐. In an example embodiment, the first ultrasonic pattern image may be acquired while no object (e.g., a finger, a palm, a water drop, an earphone cable) which may substantially change the ultrasonic pattern image is placed on the touchscreen display 240. For example, the first ultrasonic pattern image may be a background image which is the ultrasonic pattern image based on the air state. The electronic device 101 may map and at least temporarily store in the memory 130 the obtained first calibration fingerprint image 720a and temperature information (e.g., −5☐) of acquiring the first calibration fingerprint image 720a.

In an example embodiment, the processor 630 may receive the first ultrasonic pattern image from the touchscreen display 240 or the in-display fingerprint sensor 360. The processor 630 may obtain the first calibration fingerprint image 720a using the first ultrasonic pattern image and the reference fingerprint image 710. The processor 630 may obtain the first calibration fingerprint image 720a, by synthesizing at least part of the first ultrasonic pattern image and at least part of the reference fingerprint image 710. For example, the processor 630 may obtain the calibration fingerprint image 720a corresponding to the second temperature, using the reference fingerprint image 710 which corresponds to the first temperature (e.g., the reference temperature) and the ultrasonic pattern image (the background image) which corresponds to the second temperature and the air state.

Referring to FIG. 7C, the electronic device 101 may obtain a second calibration fingerprint image 720b, by calibrating the in-display fingerprint sensor 360. Before obtaining the second calibration fingerprint image 720b, the electronic device 101 may first obtain a second ultrasonic pattern image (not shown) corresponding to the current temperature. For example, the second ultrasonic pattern image may be acquired while an object (e.g., a water drop 730) which may substantially change the pattern image is placed on the touchscreen display 240.

In an example embodiment, the processor 630 may receive the second ultrasonic pattern image from the touchscreen display 240 or the in-display fingerprint sensor 360. The processor 630 may obtain the second calibration fingerprint image 720b using the second ultrasonic pattern image and the reference fingerprint image 710. The processor 630 may obtain the second calibration fingerprint image 720b, by synthesizing at least part of the second ultrasonic pattern image and at least part of the reference fingerprint image 710.

In an example embodiment, unlike FIG. 7B, the processor 630 may discard the obtained second calibration fingerprint image 720b. Unlike the first ultrasonic pattern image corresponding to the air state, the second ultrasonic pattern image used to acquire the second calibration fingerprint image 720b does not correspond to the air state. For example, the second ultrasonic pattern image is acquired while the object which may substantially change the pattern image is placed on the touchscreen display 240. Hence, since the second calibration fingerprint image 720b may not accurately represent features (e.g., distribution of valleys and ridges) of the user's fingerprint unlike the reference fingerprint image 710 and the first calibration fingerprint image 720a, the processor 630 may discard the obtained second calibration fingerprint image 720b.

Although not depicted, if the object which may substantially change the pattern image is placed on the touchscreen display 240, the processor 630 may not calibrate the in-display fingerprint sensor 360. As shown in FIG. 7C, if the water drops which may substantially change the pattern image are placed on the touchscreen display 240, the processor 630 may not calibrate the in-display fingerprint sensor 360.

Figure 8:
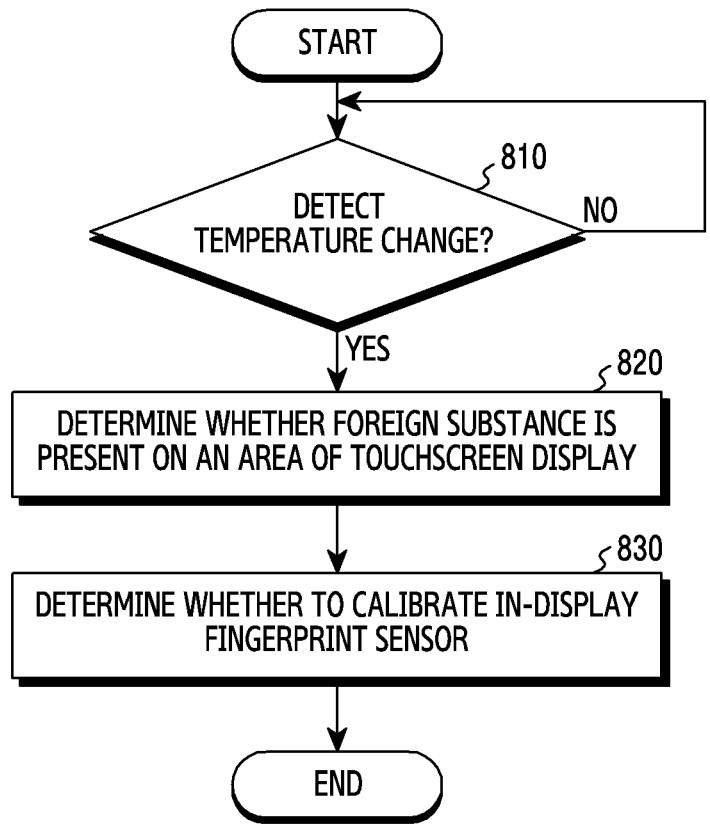
FIG. 8 is a flowchart illustrating example operations for calibrating an in-display fingerprint sensor according to various embodiments of the disclosure.

FIG. 8 is a flowchart illustrating example operations for calibrating an in-display fingerprint sensor according to various embodiments of the disclosure.

The operations of FIG. 8 may be performed by an electronic device (e.g., the electronic device 101 of FIG. 1, the electronic device 101 of FIG. 6, or a processor (e.g., the processor 630 of FIG. 6) of the electronic device 101). Hereafter, it is disclosed that the processor 630 fulfills the operations.

In an example embodiment, in operation 810, the processor 630 may detect a temperature change. For example, the processor 630 may detect the temperature change, using a temperature sensor (e.g., the temperature sensor 640 of FIG. 6) of an in-display fingerprint sensor (e.g., the in-display fingerprint sensor 360 of FIG. 3). If detecting no temperature change (NO), the processor 630 may repeat operation 810. For example, the processor 630 may perform operation 810 repeatedly or periodically, until the temperature change is detected.

In an example embodiment, the processor 630 may periodically detect the current temperature (e.g., the temperature inside or outside the electronic device 101) of the electronic device 101, and detect the temperature change by determining the current temperature of the electronic device 101 is different from a designated temperature (e.g., the reference temperature) over a designated value. For example, the processor 630 may detect the temperature change, by identifying that the current temperature of the electronic device 101 is different from the designated temperature (e.g., the reference temperature). For example, the processor 630 may detect the temperature change, by identifying that the current temperature does not fall within a range (e.g., the range which defines its lower bound by subtracting a pre-designated value from the designated temperature and its upper bound by adding the pre-designated value to the designated temperature) of the designated temperature (e.g., the reference temperature).

In an example embodiment, the processor 630 may detect the temperature change, by further using one or more calibration fingerprint images stored in a memory (e.g., the memory 620 of FIG. 6). For example, if the memory 620 stores a first calibration fingerprint image corresponding to a first temperature and a second calibration fingerprint image corresponding to a second temperature, the processor 630 may detect the temperature change, by identifying that the current temperature of the electronic device 101 is different from the first temperature and the second temperature (or identifying that the current temperature does not fall within a range of the first temperature and a range of the second temperature). For example, if a calibration fingerprint image (e.g., the first calibration fingerprint image) corresponding to a temperature (e.g., the first temperature) different from a designated temperature (e.g., the reference temperature) is already stored in the memory 620 and the current temperature is substantially the same as the first temperature, the processor 630 may determine no temperature change detected. If the calibration fingerprint image (e.g., the first calibration fingerprint image) corresponding to the temperature (e.g., the first temperature) different from the designated temperature (e.g., the reference temperature) is already stored in the memory 620 and the current temperature is different from the designated temperature (e.g., the reference temperature), the processor 630 may determine the temperature change detected though the current temperature is substantially the same as the first temperature.

In an example embodiment, if detecting the temperature change (YES) in operation 810, the processor 630 may perform operation 820.

In an example embodiment, in operation 820, the processor 630 may determine whether there is a foreign substance in an area of the touchscreen display.

In an example embodiment, the area of the touchscreen display (e.g., the touchscreen display 240 of FIG. 2) may be at least part of the surface of the touchscreen display 240. In another embodiment, the at least part of the surface of the touchscreen display 240 may be an area overlapping the in-display fingerprint sensor 360, when viewed from above the touchscreen display 240, on the surface of the touchscreen display 240.

In an example embodiment, the foreign substance may indicate an external object which may substantially change the pattern image (e.g., the touch pattern image, the ultrasonic pattern image). For example, the foreign substance may be a conductor such as, for example, and without limitation, a finger, a palm, a water drop, an earphone cable, or the like. For example, the foreign substance may be a nonconductive material formed of rubber or sponge.

In an example embodiment, the processor 630 may obtain a touch pattern image of a capacitance change caused by the foreign substance present in the area of the touchscreen display 240, and determine presence or absence of the foreign substance using the obtained touch pattern image. Herein, the foreign substance may include one or more conductors. The touch pattern image may be determined, for example, and without limitation, by at least one of a shape, a thickness, a distribution, and a size of a capacitive layer formed by one or more conductors present on the surface of the touchscreen display 240, and the shape of the capacitive layer formed by the one or more conductors may be determined by at least one of a shape, a form, and a curve of the one or more conductors. The processor 630 may determine the presence or the absence of the foreign substance on the one area of the touchscreen display 240, by comparing the obtained touch pattern image with one or more touch pattern images stored in the memory 620. The memory 620 may store the one or more touch pattern images. The memory 620 may receive one or more touch pattern images received from an external electronic device (e.g., the server 108 of FIG. 1) from a communication interface (e.g., the communication module 190 of FIG. 1), or store one or more touch pattern images previously acquired using the touchscreen display 240.

In an example embodiment, the one or more touch pattern images stored in the memory 620 may be classified into one or more groups. For example, the memory 620 may receive the one or more touch pattern images classified into one or more groups, from the communication interface. For example, a TSP IC (e.g., the TSP IC 540) may classify the one or more touch pattern images into one or more groups, based on a distribution shape or pattern (e.g., a two-dimensional image generated by representing the capacitance changes of the same level in the same color) of the capacitance change. Each group may correspond to the type of a different foreign substance (or the presence or the absence of the foreign substance). For example, the first group may correspond to the finger, the second group may correspond to the palm, and the third group may correspond to the absence of the foreign substance. The memory 620 may store a representative touch pattern image corresponding to each group. The representative touch pattern image may include a common feature (or feature point) of the one or more touch pattern images of the respective groups. The processor 630 may determine the presence or the absence of the foreign substance on the one area of the touchscreen display 240, by comparing the obtained touch pattern image with the one or more representative touch pattern images stored in the memory 620.

In an example embodiment, the processor 630 may determine the presence or the absence of the foreign substance on the one area of the touchscreen display 240, by comparing the obtained touch pattern image with the one or more representative touch pattern images corresponding to the respective groups. For example, the processor 630 may determine the representative touch pattern image having similarity over a first reference value with the obtained touch pattern image, and determine the presence or the absence of the foreign substance (e.g., determine the presence of the foreign substance) on the one area of the touchscreen display 240 based on the group (e.g., the first group corresponding to the finger) corresponding to the determined representative touch pattern image. For example, if there is no representative touch pattern image having the similarity over the first reference value with the obtained touch pattern image, the processor 630 may determine the absence of the foreign substance on the one area of the touchscreen display 240. For example, if there is no representative touch pattern image having the similarity over the first reference value with the obtained touch pattern image and the obtained touch pattern image and the representative touch pattern image of the group (e.g., the third group) corresponding to the absence of the foreign substance have the similarity over a second reference value, the processor 630 may determine the absence of the foreign substance on the one area of the touchscreen display 240.

In an example embodiment, the processor 630 may detect a sensing data change of a pressure sensor caused by the foreign substance present on the one area of the touchscreen display 240, and determine the presence or the absence of the foreign substance using the detected sensing data change. In an example embodiment, at least one pressure sensor (e.g., the at least one pressure sensor of FIG. 3) may periodically sense a level of a pressure or an external force applied onto the touchscreen display 240, and at least temporarily store the sensing data in the memory 620. The processor 630 may determine the presence or the absence of the foreign substance using the sensing data stored in the memory 620 or the data sensed by the pressure sensor 380. For example, the processor 630 may determine the presence or the absence of the foreign substance (e.g., determine the presence of the foreign substance), in response to detecting that the level of the pressure or the external force exerted on the touchscreen display 240 exceeds a third reference value).

In an example embodiment, in operation 830, the processor 630 may determine whether to calibrate the in-display fingerprint sensor.

In an example embodiment, based on the presence or the absence of the foreign substance identified in operation 820, the processor 630 may determine whether to calibrate the in-display fingerprint sensor. For example, the processor 630 may not calibrate the in-display fingerprint sensor if determining a foreign substance present on the area of the touchscreen display 240, and may calibrate the in-display fingerprint sensor if determining no foreign substance present on the one area of the touchscreen display 240. For example, if determining no foreign substance on the one area of the touchscreen display 240, the processor 630 may calibrate the in-display fingerprint sensor 360 by obtaining a calibration fingerprint image. The processor 630 may obtain an ultrasonic pattern image corresponding to the current temperature, using the in-display fingerprint sensor 360, and obtain a calibration pattern image corresponding to the current temperature, by further using a reference fingerprint image stored in the memory 620.

In an example embodiment, if the calibration fingerprint image (e.g., the first calibration fingerprint image) corresponding to the temperature (e.g., the first temperature) different from the designated temperature (e.g., the reference temperature) is already stored in the memory 620 and the current temperature is different from the designated temperature (e.g., the reference temperature), the processor 630 may determine the temperature change detected, though the current temperature is substantially equals to the first temperature. In this example, the processor 630 may generate a new calibration fingerprint image for the first temperature according to the presence or the absence of the foreign substance, and store the new calibration fingerprint image in the memory 620. For example, two or more calibration fingerprint images may be stored for the same temperature, and the processor 630 may at least temporarily delete at least one of the two or more calibration fingerprint images from the memory 620. Alternatively, at least one calibration fingerprint image including statistically abnormal data compared with the rest may be at least temporarily deleted from the memory 620.

Figure 9:
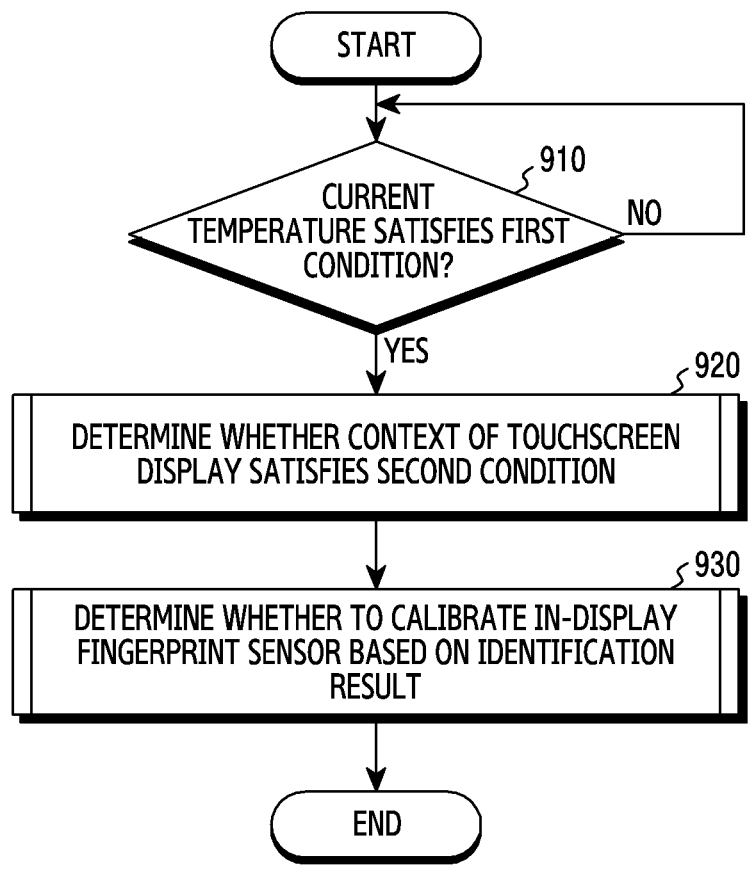
FIG. 9 illustrates operations for calibrating an in-display fingerprint sensor according to various embodiments of the disclosure.

FIG. 9 is a flowchart illustrating example operations for calibrating an in-display fingerprint sensor according to various embodiments of the disclosure.

The operations of FIG. 9 may be performed by an electronic device (e.g., the electronic device 101 of FIG. 1) or a processor (e.g., the processor 630 of FIG. 6) of the electronic device 101. Hereafter, it is disclosed that the processor 630 fulfills the operations.

In an example embodiment, in operation 910, the processor 630 may determine whether current temperature satisfies a first condition. For example, the processor 630 may determine whether the current temperature satisfies the first condition, using a temperature sensor (e.g., the temperature sensor 640) of the in-display fingerprint sensor (e.g., the in-display fingerprint sensor 360 of FIG. 3). The first condition may be related to the temperature among calibration conditions of the in-display fingerprint sensor 360. The first condition may determine whether the current temperature falls within a designated range, and the designated range may not include a reference temperature corresponding to a reference fingerprint image stored in a memory (e.g., the memory 620 of FIG. 6) and one or more temperatures corresponding to one or more calibration fingerprint images.

In an example embodiment, if the current temperature does not satisfy the first condition (NO), the processor 630 may return to operation 910. That is, the processor 630 may repeatedly or periodically perform operation 910 until the current temperature satisfies the first condition.

In an example embodiment, if the current temperature satisfies the first condition (YES) in operation 910, the processor 630 may determine whether context of a touchscreen display satisfies a second condition in operation 920.

In an example embodiment, the context of the touchscreen display (e.g., the touchscreen display 240 of FIG. 2) may be a factor for a physical environment such as the surface of the touchscreen display 240 or a nonphysical environment such as a task executed at a TSP IC (e.g., the TSP IC 540 of FIG. 5). For example, the context of the touchscreen display 240 may pertain to at least one of whether an object (e.g., a finger, a palm, a water drop, an earphone cable) which may substantially change a pattern image (e.g., a touch pattern image, an ultrasonic pattern image) is present on the surface of the touchscreen display 240, whether a touch event occurs on the touchscreen display 240, and whether the TSP IC 540 calibrates a touch sensor. For example, the processor 630 may identify whether a foreign substance is present on the surface of the touchscreen display 240.

In an example embodiment, the processor 630 may identify the context of the touchscreen display 240 based on a current time, or based on a time of detecting the temperature which satisfies the first condition. In another embodiment, the processor 630 may identify the context of the touchscreen display 240, based on a specific time duration. For example, the processor 630 may identify the context of the touchscreen display 240, based on the time duration including the current time and the time of detecting the temperature which satisfies the first condition.

In an example embodiment, the processor 630 may determine whether the identified context satisfies a second condition. The second condition may be set in addition to the first condition for calibrating the fingerprint sensor. For example, if no object (e.g., a finger, a palm, a water drop, an earphone cable) which may substantially change the pattern image is present on the touchscreen display 240, no touch event occurs on the touchscreen display 240, and the TSP IC 540 does not calibrate the touch sensor, the processor 630 may determine that the identified context satisfies the second condition.

In an example embodiment, in operation 930, the processor 630 may determine whether to calibrate the in-display fingerprint sensor, according to the identification result in operation 920. The processor 630 may calibrate the in-display fingerprint sensor 360, according to the identification result of operation 920. For example, the processor 630 may calibrate the in-display fingerprint sensor 360 in response to determining that the identified context satisfies the second condition, and may not calibrate the in-display fingerprint sensor 360 in response to determining that the identified context does not satisfy the second condition.

Figure 10:
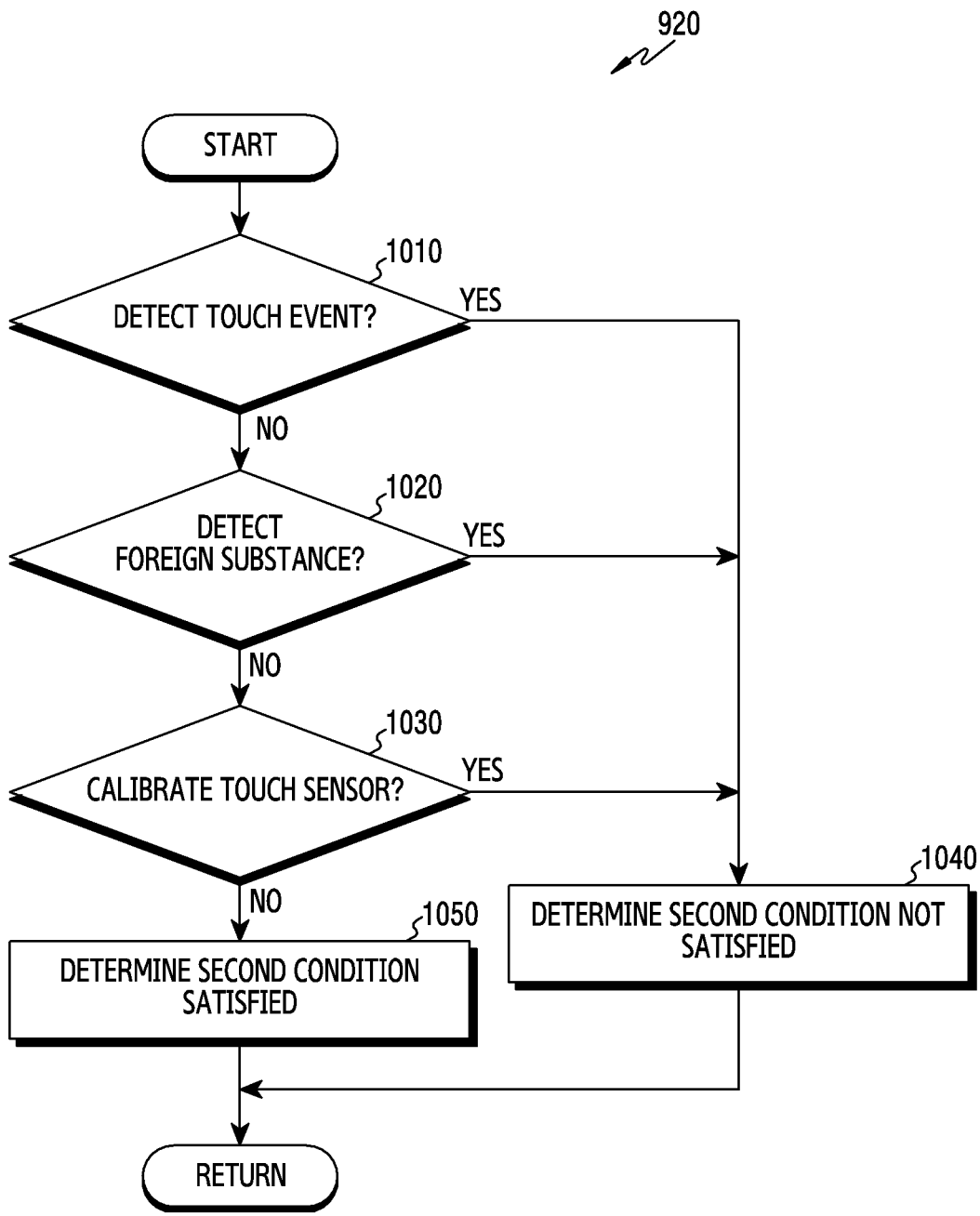
FIG. 10 is a flowchart illustrating example operations for identifying whether context relating to a touchscreen display satisfies a second condition according to various embodiments of the disclosure.

FIG. 10 is a flowchart illustrating example operations for identifying whether context of a touchscreen display satisfies a second condition according to various embodiments of the disclosure.

The operations of FIG. 10 may, for example, illustrate detailed operations of operation 920 of FIG. 9.

In an example embodiment, in operation 1010, the processor 630 may identify whether a touch event is detected. For example, based on data received from a touchscreen display 240, the processor 630 may identify whether a gesture touch input to the touchscreen display 240 is detected.

In an example embodiment, if detecting the touch event (YES), the processor 630 may determine that the context of the touchscreen display does not satisfy the second condition in operation 1040. For example, if detecting the touch event, the processor 630 may not calibrate the in-display fingerprint sensor 360, though the current temperature satisfies the first condition for calibrating the in-display fingerprint sensor 360. If detecting no touch event (NO), the processor 630 may perform operation 1020.

In an example embodiment, in operation 1020, the processor 630 or the touchscreen display 240 may identify whether a foreign substance is present on the surface of the touchscreen display 240. For example, the foreign substance may indicate a conductor such as a finger, a palm, a water drop, and an earphone cable, which may substantially change the pattern image. For example, the foreign substance may be a nonconductive material formed of rubber or sponge.

In an example embodiment, the processor 630 may identify whether the foreign substance is present on the surface of the touchscreen display 240, for example, identify the presence or the absence of the foreign substance, by calculating a signal level regarding a capacitance change. The processor 630 or the touchscreen display 240 may obtain a touch pattern image regarding the capacitance change, compare the obtained touch pattern image with one or more touch pattern images (e.g., representative touch pattern images) stored in the memory 620, and thus identify whether the foreign substance is present on the surface of the touchscreen display 240.

In an example embodiment, if the obtained touch pattern image and the representative touch pattern image of the group (e.g., the third group) corresponding to the absence of the foreign substance have the similarity over a second reference value which is designated, the processor 630 may determine no foreign substance on the surface of the touchscreen display 240. If the obtained touch pattern image and the representative touch pattern image of the group (e.g., the third group) corresponding to the absence of the foreign substance have the similarity over the designated second reference value, and the obtained touch pattern image and representative touch pattern images of one or more groups (e.g., the first group corresponding to the finger or the second group corresponding to the palm) corresponding to the presence of the foreign substance have the similarity below the designated first reference value, the processor 630 may determine no foreign substance on the surface of the touchscreen display 240.

In another embodiment, if the obtained touch pattern image and the representative touch pattern image of at least one of the one or more groups (e.g., the first group corresponding to the finger, the second group corresponding to the palm) corresponding to the presence of the foreign substance have the similarity over the designated first reference value, the processor 630 may determine the foreign substance is present on the surface of the touchscreen display 240. If the obtained touch pattern image and the representative touch pattern image of the group (e.g., the third group) corresponding to the absence of the foreign substance have the similarity below the designated second reference value, and the obtained touch pattern image and the representative touch pattern image of at least one of the one or more groups corresponding to the presence of the foreign substance have the similarity over the designated first reference value, the processor 630 may determine the foreign substance present on the surface of the touchscreen display 240.

In an example embodiment, if determining the foreign substance on the surface of the touchscreen display 240, the processor 630 may identify the type of the foreign substance present on the surface of the touchscreen display 240. The processor 630 may identify the type of the foreign substance present on the surface of the touchscreen display 240, using one or more touch pattern images (e.g., representative touch pattern images) stored in the memory 620. For example, if the obtained touch pattern image and the representative touch pattern image of at least one of the one or more groups corresponding to the presence of the foreign substance have the similarity over the designated first reference value, the processor 630 may identify the type (e.g., the finger) of the foreign substance based on the group (e.g., the first group) corresponding to the representative touch pattern image. If the obtained touch pattern image and the representative touch pattern images of some of the one or more groups (e.g., the first group corresponding to the finger, the second group corresponding to the palm) corresponding to the presence of the foreign substance have the similarity over the designated first reference value, the processor 630 may identify the type (e.g., the finger) of the foreign substance based on the group (e.g., the first group corresponding to the finger) corresponding to the representative touch pattern image of higher similarity.

In an example embodiment, the processor 630 may determine a sensing data change of the pressure sensor caused by the foreign substance present on the surface of the touchscreen display 240, and determine the presence or the absence of the foreign substance using the detected sensing data change. For example, in response to detecting that the level of the pressure or the external force exerted on the touchscreen display 240 exceeds a designated third reference value, the processor 630 may determine the presence or the absence of the foreign substance (e.g., determine the presence of the foreign substance).

In an example embodiment, the processor 630 may determine the presence or the absence of the foreign substance in a different manner, by considering a different feature (e.g., conductive or nonconductive) of the foreign substance present on the surface of the touchscreen display 240. For example, by considering that the foreign substance present on the surface may be conductive, the processor 630 may identify the presence or the absence of the foreign substance using the touch pattern image relating to the capacitance change. By considering that the foreign substance present on the surface may be nonconductive, the processor 630 may identify the presence or the absence of the foreign substance using the pressure sensing data (e.g., the change of the pressure sensing data). If not identifying the presence or the absence of the foreign substance using the touch pattern image, the processor 630 may further identify the presence or the absence of the foreign substance using the pressure sensing data, and vice versa.

In an example embodiment, if detecting the foreign substance on the surface of the touchscreen display 240 (YES), the processor 630 may determine that the context of the touchscreen display 240 does not satisfy the second condition in operation 1040. For example, if detecting the foreign substance on the touchscreen display 240, the processor 630 may not calibrate the in-display fingerprint sensor 360 though the current temperature satisfies the first condition for calibrating the in-display fingerprint sensor 360.

In an example embodiment, if detecting no foreign substance on the surface of the touchscreen display 240 (NO), the processor 630 may determine whether the touch sensor is calibrated in operation 1030.

In an example embodiment, the touch sensor may be a sensor for detecting the user's touch input, in the touchscreen display 240. The touch sensor may perform the calibration independently of the in-display fingerprint sensor 360. For example, the TSP IC 540 may calibrate the touch sensor, according to at least one of external noise inflow and the temperature change around the touchscreen panel 330.

In an example embodiment, if the touch sensor is calibrated (YES), the processor 630 may determine that the context of the touchscreen display 240 does not satisfy the second condition in operation 1040. For example, if the touch sensor is calibrated, the processor 630 may not calibrate the in-display fingerprint sensor 360, though the current temperature satisfies the first condition for calibrating the in-display fingerprint sensor 360.

In an example embodiment, if the touch sensor is not calibrated (NO), the processor 630 may determine that the context of the touchscreen display 240 satisfies the second condition in operation 1050. In response to determining that the context of the touchscreen display 240 satisfies the second condition, the processor 630 may calibrate the in-display fingerprint sensor 360.

In an example embodiment, although not depicted, the processor 630 may determine whether the second condition is satisfied, according to whether a pressure sensor (e.g., the pressure sensor 380 of FIG. 3) is calibrated. For example, if the pressure sensor is calibrated, the processor 630 may determine that the context of the touchscreen display 240 does not satisfy the second condition. If the pressure sensor is not calibrated, the processor 630 may determine that the context of the touchscreen display 240 satisfies the second condition.

In an example embodiment, although not depicted, the processor 630 may determine that the context of the touchscreen display 240 satisfies the second condition, by performing at least one of operation 1010, operation 1020, and operation 1030. For example, if detecting no touch event and determining no foreign substance on the surface of the touchscreen display 240, the processor 630 may determine that the context of the touchscreen display 240 satisfies the second condition, regardless of the calibration of the touch sensor.

Figure 11:
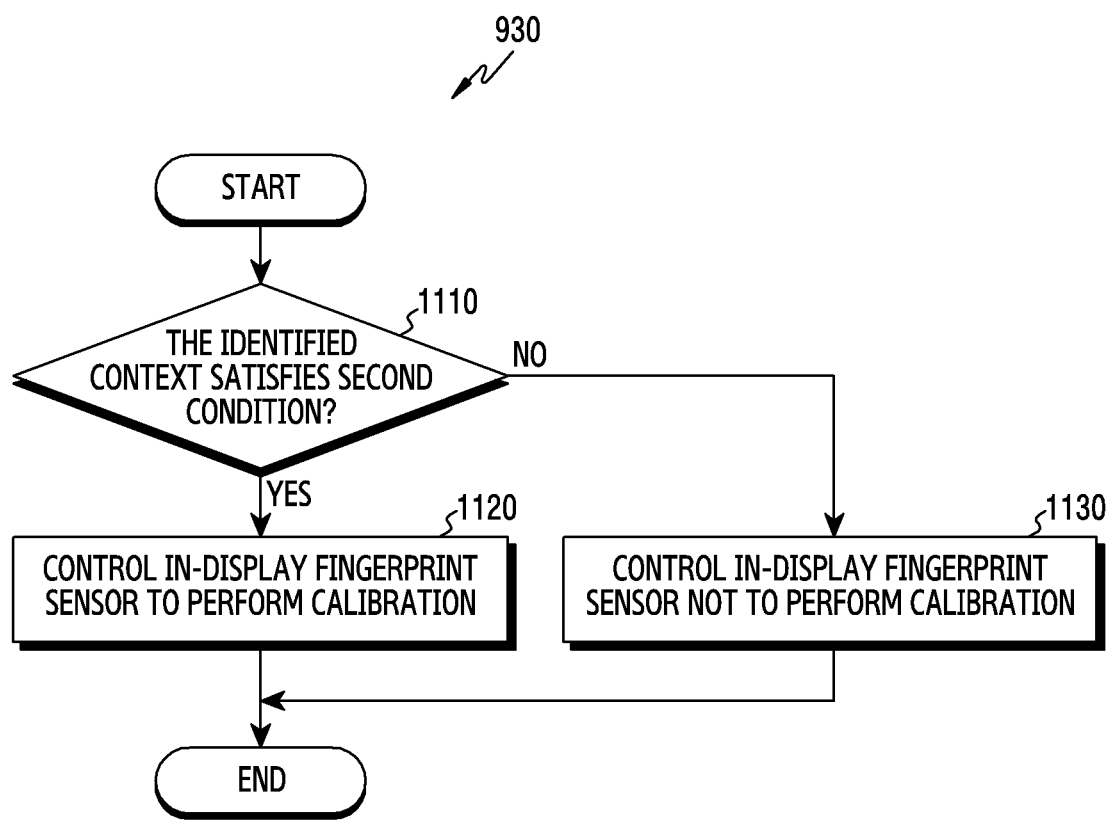
FIG. 11 is a flowchart illustrating example operations for calibrating an in-display fingerprint sensor according to various embodiments of the disclosure.

FIG. 11 is a flowchart illustrating example operations for calibrating an in-display fingerprint sensor according to various embodiments of the disclosure.

The operations of FIG. 11 may, for example, be detailed operations of operation 930 of FIG. 9.

In an example embodiment, in operation 1110, the processor 630 may determine whether the identified context satisfies the second condition. The processor 630 may determine whether the context of the touchscreen display 240 identified in operation 920 of FIG. 9 satisfies the second condition.

In an example embodiment, if the identified context satisfies the second condition (YES), the processor 630 may control the in-display fingerprint sensor 360 to perform the calibration based on the temperature change in operation 1120. In an example embodiment, the processor 630 may generate a calibration fingerprint image. For example, the processor 630 may obtain an ultrasonic pattern image corresponding to the current temperature, using the in-display fingerprint sensor 360, and generate the calibration fingerprint image corresponding to the current temperature, using the ultrasonic pattern image corresponding to the current temperature and a reference fingerprint image corresponding to a reference temperature. The processor 630 may at least temporarily store the calibration fingerprint image corresponding to the current temperature in the memory 620.

In an example embodiment, although not depicted, the processor 630 may perform authentication using the calibration fingerprint image corresponding to the current temperature. For example, the processor 630 may perform the user authentication, by recognizing a user's fingerprint and comparing the recognized user's fingerprint with the calibration fingerprint image stored in the memory 620. In so doing, the temperature in recognizing the user's fingerprint and the temperature corresponding to the calibration fingerprint image may be substantially identical or fall within a designated margin of error.

In an example embodiment, if determining that the identified context does not satisfy the second condition (NO), the processor 630 may control the in-display fingerprint sensor 360 not to perform the calibration based on the temperature change in operation 1130. Although the temperature change is detected, the processor 630 may, determining that the calibration of the in-display fingerprint sensor 360 based on the temperature change is unnecessary, may send an instruction or a command for limiting the calibration to the in-display fingerprint sensor 360 so as not to perform the calibration.

Figure 12:
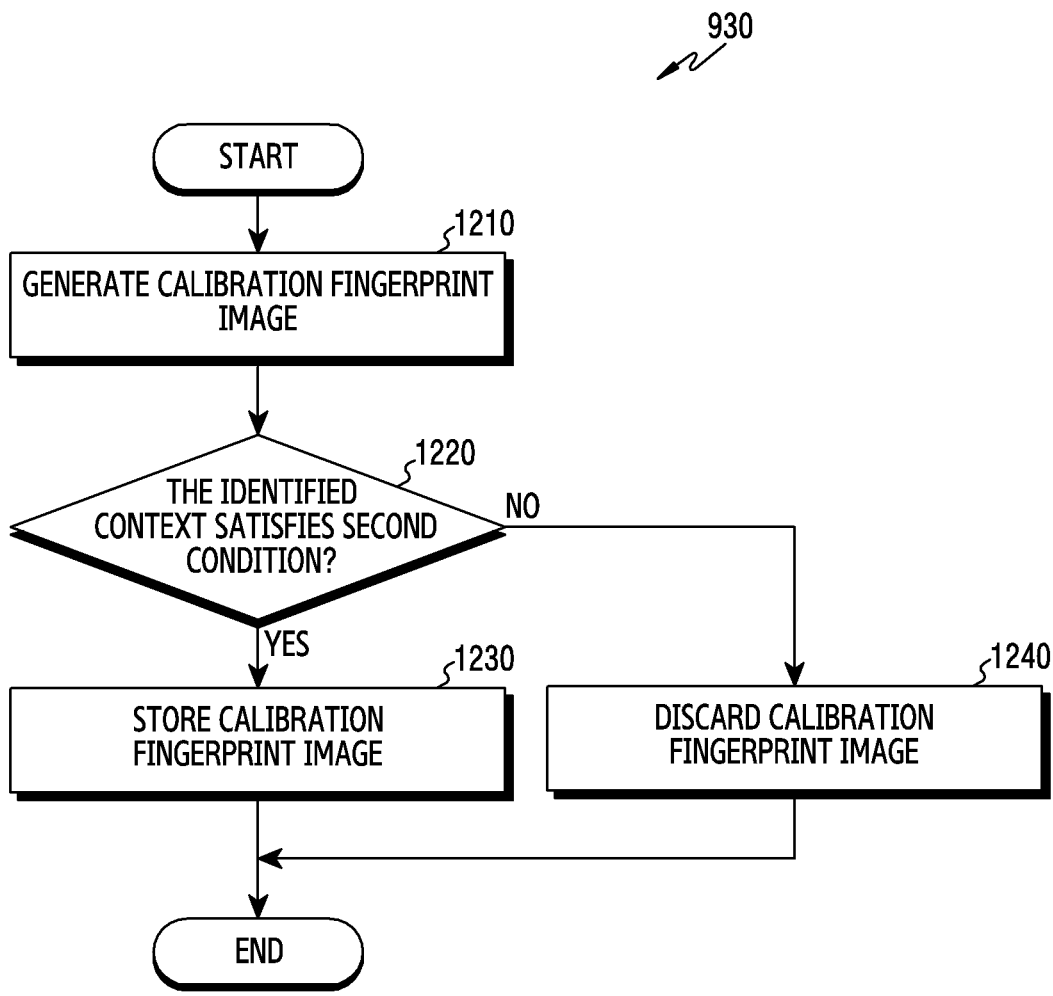
FIG. 12 is a flowchart illustrating example operations for calibrating an in-display fingerprint sensor according to various embodiments of the disclosure.

FIG. 12 is a flowchart illustrating example operations for calibrating an in-display fingerprint sensor according to various embodiments of the disclosure.

The operations of FIG. 12 may, for example, be detailed operations of operation 930 of FIG. 9.

In an example embodiment, in operation 1210, the processor 630 may generate the calibration fingerprint image. The processor 630 may generate the calibration fingerprint image, regardless of whether the context of the touchscreen display 240 satisfies the second condition. In an example embodiment, the processor 630 may obtain the ultrasonic pattern image corresponding to the current temperature, using the in-display fingerprint sensor 360. The ultrasonic pattern image may be a background image which is the ultrasonic pattern image based on the air state. The processor 630 may generate the calibration fingerprint image corresponding to the current temperature, using the ultrasonic pattern image corresponding to the current temperature and the reference fingerprint image corresponding to the reference temperature.

In an example embodiment, in operation 1220, the processor 630 may determine whether the context of the touchscreen display 240 satisfies the second condition.

In an example embodiment, if the identified context does not satisfy the second condition (NO), the processor 630 may discard the calibration fingerprint image in operation 1240. The processor 630 may delete the calibration fingerprint image generated in operation 1210, or may not store the calibration fingerprint image in the memory 620.

In an example embodiment, if the identified context satisfies the second condition (YES), the processor 630 may store the calibration fingerprint image in operation 1230. The processor 630 may store the calibration fingerprint image generated in operation 1210, in the memory 620 at least temporarily or semi-permanently.

Figure 13:
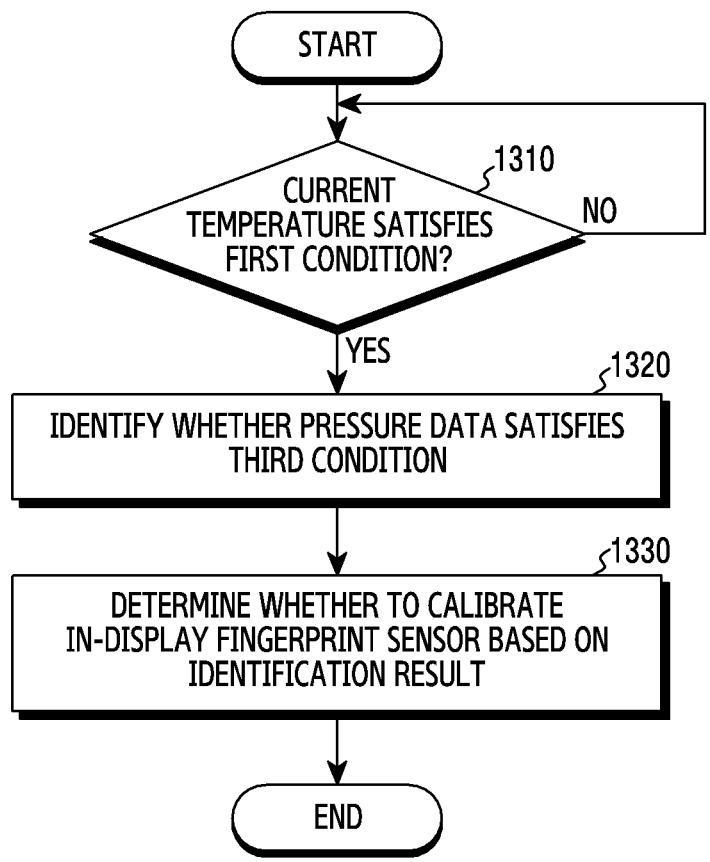
FIG. 13 is a flowchart illustrating example operations for calibrating an in-display fingerprint sensor according to various embodiments of the disclosure.

FIG. 13 is a flowchart illustrating example operations for calibrating an in-display fingerprint sensor according to various embodiments of the disclosure.

The operations of FIG. 13 may be performed by an electronic device (e.g., the electronic device 101 of FIG. 1), or a processor (e.g., the processor 630 of FIG. 6) of the electronic device 101. Hereafter, it is disclosed that the processor 630 fulfills the operations.

In an example embodiment, in operation 1310, the processor 630 may determine whether the current temperature satisfies the first condition. In an example embodiment, the processor 630 may determine whether the current temperature satisfies the first condition, by comparing the reference temperature stored in a memory (e.g., the memory 620 of FIG. 6) with the current temperature of the electronic device 101. If the current temperature does not satisfy the first condition (NO), the processor 630 may repeat operation 1310.

In an example embodiment, if the current temperature satisfies the first condition (YES), the processor 630 may perform operation 1320.

In an example embodiment, in operation 1320, the processor 630 may identify whether pressure data satisfies a third condition.

In an example embodiment, the processor 630 may identify whether the pressure data received from the pressure sensor (e.g., the pressure sensor 380 of FIG. 3) satisfies the third condition. The third condition is set in addition to the first condition, for the sake of the calibration of the in-display fingerprint sensor, and may be related to the pressure data. For example, the processor 630 may identify whether the external force over a designated value is exerted on at least part of the surface of the touchscreen display (e.g., the touchscreen display 240 of FIG. 2). For example, the processor 630 may identify whether the pressure data is distributed in a designated pattern, on at least part of the surface of the touchscreen display 240.

In an example embodiment, in operation 1330, the processor 630 may determine whether to calibrate the in-display fingerprint sensor, according to the identification result. The processor 630 may determine whether to calibrate the in-display fingerprint sensor (e.g., the in-display fingerprint sensor 360), according to the identification result of operation 1320. For example, in response to determining that the pressure data satisfies the third condition, the processor 630 may determine to calibrate the in-display fingerprint sensor 360. In response to determining that the pressure data does not satisfy the third condition, the processor 630 may determine not to calibrate the in-display fingerprint sensor 360. The processor 630 may control the in-display fingerprint sensor 360 to calibrate the in-display fingerprint sensor 360, in response to determining that the pressure data satisfies the third condition, and may control the in-display fingerprint sensor 360 not to calibrate the in-display fingerprint sensor 360, in response to determining that the pressure data does not satisfy the third condition.

In an example embodiment, as shown in FIG. 13, if the current temperature satisfies the first condition, the processor 630 may determine whether to calibrate the in-display fingerprint sensor 360, depending on whether the pressure data satisfies the designated condition (the third condition), regardless of the context of the touchscreen display.

Figure 14:
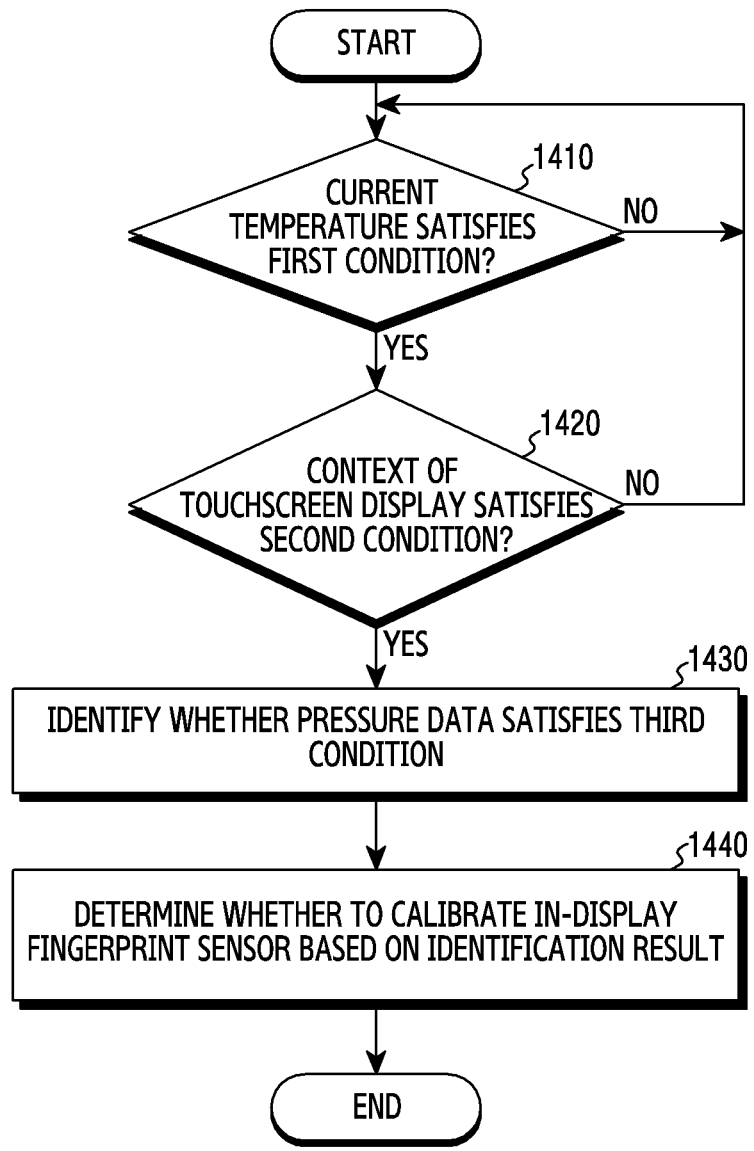
FIG. 14 is a flowchart illustrating example operations for calibrating an in-display fingerprint sensor according to various embodiments of the disclosure.

FIG. 14 is a flowchart illustrating example operations for calibrating an in-display fingerprint sensor according to various embodiments of the disclosure.

The operations of FIG. 14 may be performed by an electronic device (e.g., the electronic device 101 of FIG. 1) or a processor (e.g., the processor 630 of FIG. 6) of the electronic device 101. Hereafter, it is disclosed that the processor 630 fulfills the operations.

In an example embodiment, in operation 1410, the processor 630 may determine whether a current temperature satisfies a first condition. In an example embodiment, the processor 630 may determine whether the current temperature satisfies the first condition, by comparing the reference temperature stored in the memory 620 with the current temperature of the electronic device 101.

If the current temperature does not satisfy the first condition (NO), the processor 630 may repeat operation 1410.

In an example embodiment, if the current temperature satisfies the first condition (YES), the processor 630 may determine whether context of a touchscreen display (e.g., the touchscreen display 240) satisfies a second condition in operation 1420. For example, by determining no foreign substance present on the surface of the touchscreen display 240, the processor 630 may determine that the identified context satisfies the second condition.

In an example embodiment, if the context of the touchscreen display 240 does not satisfy the second condition (NO), the processor 630 may return to operation 1410.

In an example embodiment, if the context of the touchscreen display 240 satisfies the second condition (YES), the processor 630 may identify whether pressure data satisfies a third condition in operation 1430. For example, the processor 630 may identify whether the pressure data is distributed in a designated pattern, on at least part of the surface of the touchscreen display 240. In an example embodiment, the processor 630 may identify the pressure data satisfying the third condition, based on the current time, based on the time of detecting the temperature which satisfies the first condition, or based on the time of identifying the context which satisfies the second condition.

In an example embodiment, in operation 1440, the processor 630 may determine whether to calibrate the in-display fingerprint sensor, according to the identification result. The processor 630 may determine whether to calibrate the in-display fingerprint sensor (e.g., the in-display fingerprint sensor 360), according to the identification result of operation 1430. For example, in response to determining that the pressure data satisfies the third condition, the processor 630 may determine to calibrate the in-display fingerprint sensor 360 and control the in-display fingerprint sensor 360 to perform the calibration. For example, the processor 630 may determine that the pressure data does not satisfy the third condition, and control the in-display fingerprint sensor 360 not to calibrate the in-display fingerprint sensor 360.

In FIG. 14, the processor 360 may sequentially determine whether the first condition corresponding to the temperature is satisfied, whether the second condition corresponding to the context of the touchscreen display is satisfied, and whether the third condition corresponding to the pressure is satisfied, but the order of the conditions is merely an example, which is not intended to limit the scope of the disclosure. For example, if the first condition is satisfied, the processor 360 may first determine whether the third condition corresponding to the pressure is satisfied. If the third condition is satisfied, the processor 360 may determine whether the second condition corresponding to the context of the touchscreen display is satisfied.

FIGS. 15A, 15B, 15C and 15D are diagrams illustrating examples of a plurality of touch pattern images based on presence or absence and a type of a foreign substance according to various embodiments of the disclosure.

In an example embodiment, if a foreign substance is present on a surface of a touchscreen display (e.g., the touchscreen display 240 of FIG. 2), a TSP IC (e.g., the TSP IC 540 of FIG. 5) may generate a corresponding touch pattern image. For example, if a palm is placed on the surface of the touchscreen display 240, a capacitance change generated by the palm may be represented with a two-dimensional image. The represented two-dimensional image may indicate the touch pattern image. The TSP IC 540 may generate a corresponding touch pattern image even if the foreign substance is not present on the surface of the touchscreen display 240.

Figure 15A:
FIG. 15A is a diagram illustrating an example of a plurality of touch pattern images based on presence or absence and a type of a foreign substance according to various embodiments of the disclosure.
Figure 15B:
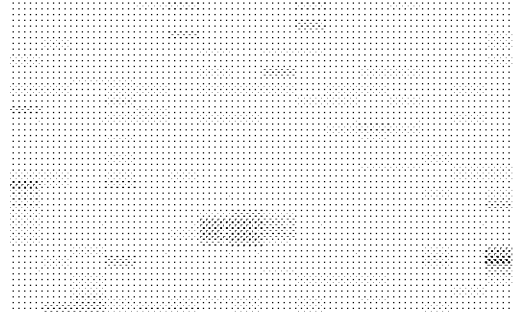
FIG. 15B is a diagram illustrating an example of the plurality of the touch pattern images based on the presence or the absence and the type of the foreign substance according to various embodiments of the disclosure.
Figure 15C:
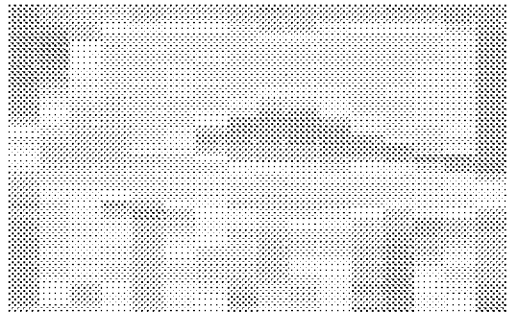
FIG. 15C is a diagram illustrating an example of the plurality of the touch pattern images based on the presence or the absence and the type of the foreign substance according to various embodiments of the disclosure.
Figure 15D:
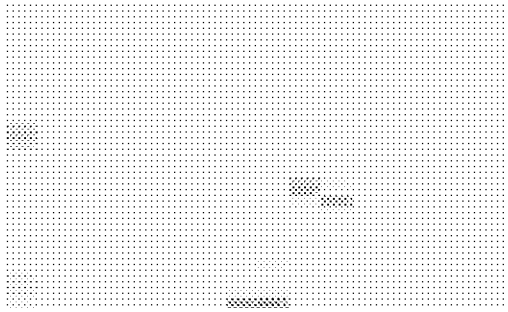
FIG. 15D is a diagram illustrating an example of the plurality of the touch pattern images based on the presence or the absence and the type of the foreign substance according to various embodiments of the disclosure.

In an example embodiment, the TSP IC 540 may divide a plurality of touch pattern images into one or more groups, based on a shape or a pattern of the distribution of the capacitance change. Each group may correspond to the type of a different foreign substance (or the presence or the absence of the foreign substance), and a representative touch pattern image corresponding to each group may be determined. The representative touch pattern image may include a common feature (or feature point) of the one or more touch pattern images of the respective groups. FIGS. 15A, 15B, 15C and 15D depict examples of representative touch pattern images corresponding to the groups respectively (or the touch pattern images of the respective groups). For example, FIG. 15A depicts the touch pattern image if no foreign substance is present on the surface of the touchscreen display 240, FIG. 15B depicts the touch pattern image if a finger is placed on the surface of the touchscreen display 240, FIG. 15C depicts the touch pattern image if a palm is placed on the surface of the touchscreen display 240, and FIG. 15D depicts the touch pattern image if a water drop is present on the surface of the touchscreen display 240

In an example embodiment, a processor (e.g., the processor 630 of FIG. 6) may determine which one of the one or more groups a touch pattern image corresponding to a current situation of the touchscreen display 240 belongs to. If the touch pattern image corresponding to the current situation of the touchscreen display 240 and the representative touch pattern image of the first group corresponding to the finger have the similarity over a designated value (e.g., the first reference value), the processor 630 may determine that the touch pattern image corresponding to the current situation belongs to the first group.

In an example embodiment, the processor 630 may determine which kind of the foreign substance is present on the surface of the touchscreen display 240. For example, in response to determining that the current touch pattern image belongs to the first group corresponding to the palm, the processor 630 may determine that the palm is currently placed on the surface of the touchscreen display 240. In response to the determination, the processor 630 may determine that context of the touchscreen display does not satisfy the second condition, and thus may not calibrate an in-display fingerprint sensor (e.g., the in-display fingerprint sensor 360 of FIG. 6).

An electronic device according to various embodiments of the disclosure may create a calibration condition for calibrating an ultrasonic in-display fingerprint sensor, and thus enhance fingerprint recognition of the ultrasonic in-display fingerprint sensor.

The memory described above may be a computer-readable storage medium. The computer-readable storage medium may include a hard disk, a floppy disk, a magnetic medium (e.g. a magnetic tape), an optical recording media (e.g. CD-ROM, DVD), a Magneto-Optical Media (e.g., a floptical disk), an internal memory, etc. Instructions stored on the computer-readable storage medium may include code made by a complier or code executable by an interpreter. The module or programming module according to the various embodiments may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While various example embodiments are disclosed and illustrated in the present disclosure, one skilled in the art will understand that the various example embodiments are intended to be illustrative, not limiting. Therefore, it should be understood that, in addition to the embodiments disclosed herein, all modifications or changed forms derived from the technical idea of the present disclosure fall within the scope of the present disclosure.

What is claimed is:

1. An electronic device comprising:
   a housing;
   a touchscreen display disposed inside the housing and viewable through one surface of the housing;
   an ultrasonic fingerprint sensor disposed inside the housing and overlapping one area of the touchscreen display, when viewed from above the one surface of the housing, and comprising a temperature measuring sensor;
   at least one processor operatively coupled with the touchscreen display and the ultrasonic fingerprint sensor; and
   at least one memory operatively coupled with the at least one processor, and configured to store a first reference fingerprint image relating to authentication using the ultrasonic fingerprint sensor,
   wherein the at least one memory is configured to store instructions that, when executed, cause the at least one processor to control the electronic device to:
   measure a temperature change using the temperature measuring sensor;
   determine a presence of a foreign substance on the one area of the touchscreen display; and
   determine whether to obtain a second reference fingerprint image corresponding to a current temperature using a pattern image obtained by the ultrasonic fingerprint sensor based on the temperature change, based at least in part on determining the presence of a foreign substance on the one area.

2. The electronic device of claim 1, wherein the at least one processor comprises an application processor, and
   the instructions, when executed, cause the application processor to:
   detect the temperature change using the temperature measuring sensor; and
   control the electronic device to obtain the second reference fingerprint image.

3. The electronic device of claim 1, wherein the at least one processor comprises an application processor and a microprocessor electrically coupled with the ultrasonic fingerprint sensor, and
   the instructions, when executed, cause the microprocessor to:
   detect the temperature change using the temperature measuring sensor;
   transmit a request regarding the presence of the foreign substance to the application processor, based at least in part on the temperature change;
   receive a response to the request; and
   obtain the second reference fingerprint image based at least in part on the received response.

4. The electronic device of claim 1, wherein the instructions, when executed, cause the at least one processor to control the electronic device to:
   generate the second reference fingerprint image from the first reference fingerprint image; and
   store the second reference fingerprint image in the at least one memory.

5. The electronic device of claim 4, wherein the instructions, when executed, cause the at least one processor to control the electronic device to:
   recognize a user fingerprint at the changed temperature, using the ultrasonic fingerprint sensor; and
   perform authentication by comparing the second reference fingerprint image with the recognized fingerprint.

6. An electronic device comprising:
   a housing;
   a touchscreen display disposed inside the housing and viewable through one surface of the housing;
   an ultrasonic fingerprint sensor disposed inside the housing and overlapping one area of the touchscreen display, when viewed from above the one surface of the housing, and comprising a temperature measuring sensor;
   at least one processor operatively coupled with the touchscreen display and the ultrasonic fingerprint sensor; and
   at least one memory operatively coupled with the at least one processor, and configured to store a first reference fingerprint image relating to authentication using the ultrasonic fingerprint sensor,
   wherein the at least one memory configured to store instructions that, when executed, cause the at least one processor to control the electronic device to:
   identify whether a current temperature satisfies a first condition using the temperature measuring sensor;
   identify whether a context of the touchscreen display satisfies a second condition; and
   determine whether to obtain a second reference fingerprint image corresponding to a current temperature using a pattern image obtained by the ultrasonic fingerprint sensor based at least in part on identifying that the current temperature satisfies the first condition and the context satisfies the second condition.

7. The electronic device of claim 6, wherein the context of the touchscreen display includes at least one of whether a touch event on the touchscreen display occurs, whether a foreign substance is present on the one area, and whether a touch sensor of the touchscreen display is calibrated.

8. The electronic device of claim 7, wherein the instructions, when executed, cause the at least one processor to control the electronic device to:
   compare a current touch pattern image with one or more touch pattern images stored in the at least one memory, to identify whether the foreign substance is present on the one area,
   wherein the one or more touch pattern images are classified into one or more groups based on the presence of a foreign substance or a type of the foreign substance.

9. The electronic device of claim 6, wherein
   the second reference fingerprint image corresponding to the current temperature is generated using an ultrasonic pattern image corresponding to the current temperature and the first reference fingerprint image corresponding to a different temperature from the current temperature.

10. The electronic device of claim 6, wherein the instructions, when executed, cause the at least one processor to control the electronic device to:

obtain the second reference fingerprint image, whether or not the context of the touchscreen display satisfies the second condition, store the second reference fingerprint image in the at least one memory based on the context of the touchscreen display satisfying the second condition; and discard the second reference fingerprint image based on the context not satisfying the second condition.

11. A method of operating an electronic device comprising a touchscreen display, an ultrasonic fingerprint sensor disposed to overlap one area of the touchscreen display, and at least one memory configured to store a first reference fingerprint image relating to authentication using the ultrasonic fingerprint sensor, the method comprising:

detecting a temperature change using a temperature measuring sensor of the ultrasonic fingerprint sensor;

determining presence of a foreign substance on the one area of the touchscreen display; and determining whether to obtain a second reference fingerprint image corresponding to a current temperature using a pattern image obtained by the ultrasonic fingerprint sensor based on the temperature change, based at least in part on determining the presence of the foreign substance on the one area.

12. The method of claim 11, wherein the electronic device comprises an application processor, wherein detecting the temperature change and obtaining the second reference fingerprint image are performed by the application processor.

13. The method of claim 11, wherein the electronic device comprises an application processor and a microprocessor which is electrically coupled with the ultrasonic fingerprint sensor, wherein detecting the temperature change, determining the presence of the foreign substance on the one area, and obtaining the second reference fingerprint image are performed by the microprocessor, wherein determining the presence of the foreign substance on the one area comprises:

transmitting a request regarding the presence of the foreign substance to the application processor based at least in part on the temperature change; and receiving a response to the request, wherein the second reference fingerprint image is obtained based at least in part on the received response.

14. The method of claim 11, wherein obtaining the second reference fingerprint image comprises:

generating the second reference fingerprint image based on the first reference fingerprint image; and storing the second reference fingerprint image.

15. The method of claim 14, further comprises:

recognizing a user fingerprint at the changed temperature using the ultrasonic fingerprint sensor; and performing authentication by comparing the second reference fingerprint image with the recognized fingerprint.

16. A method of operating an electronic device comprising a touchscreen display, an ultrasonic fingerprint sensor disposed to overlap one area of the touchscreen display, and at least one memory configured to store a first reference fingerprint image relating to authentication using the ultrasonic fingerprint sensor, the method comprising:

identifying whether a current temperature satisfies a first condition using a temperature measuring sensor of the ultrasonic fingerprint sensor;

identifying whether context of the touchscreen display satisfies a second condition; and determining whether to obtain a second reference fingerprint image corresponding to a current temperature using a pattern image obtained by the ultrasonic fingerprint sensor, based at least in part on identifying whether the first condition and the second condition are satisfied.

17. The method of claim 16, wherein the context of the touchscreen display includes at least one of whether a touch event on the touchscreen display occurs, whether a foreign substance is present on the one area, and whether the second reference fingerprint image is obtained.

18. The method of claim 17, wherein identifying whether the context of the touchscreen display satisfies the second condition comprises:

comparing a current touch pattern image with one or more touch pattern images stored in the electronic device to identify whether the foreign substance is present on the one area, wherein the one or more touch pattern images are classified into one or more groups based on the presence of the foreign substance or a type of the foreign substance.

19. The method of claim 16, wherein:

the second reference fingerprint image is obtained based on the context of the touchscreen display satisfying the second condition, and the second reference fingerprint image corresponding to the current temperature is obtained using an ultrasonic pattern image corresponding to the current temperature and the first reference fingerprint image corresponding to a different temperature from the current temperature.

20. The method of claim 16, further comprising:

obtaining the second reference fingerprint image, regardless of whether the context of the touchscreen display satisfies the second condition;

storing the second reference fingerprint image based on the context of the touchscreen display satisfying the second condition; and discarding the second reference fingerprint image based on the context not satisfying the second condition.

* * * * *